(12) United States Patent
Yoshida et al.

(10) Patent No.: US 11,778,108 B2
(45) Date of Patent: Oct. 3, 2023

(54) SYSTEM AND METHOD FOR PRINTING USING EXTRACTION SETTING INFORMATION

(71) Applicant: SATO HOLDINGS KABUSHIKI KAISHA, Tokyo (JP)

(72) Inventors: Fujio Yoshida, Tokyo (JP); Nobuyuki Nakayama, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 17/627,909

(22) PCT Filed: Jun. 1, 2020

(86) PCT No.: PCT/JP2020/021635
§ 371 (c)(1),
(2) Date: Jan. 18, 2022

(87) PCT Pub. No.: WO2021/039001
PCT Pub. Date: Mar. 4, 2021

(65) Prior Publication Data
US 2022/0407967 A1 Dec. 22, 2022

(30) Foreign Application Priority Data

Aug. 30, 2019 (JP) .................................. 2019-158490
Jun. 1, 2020 (JP) .................................. 2020-095407

(51) Int. Cl.
*H04N 1/00* (2006.01)

(52) U.S. Cl.
CPC ..... *H04N 1/00334* (2013.01); *H04N 1/00331* (2013.01)

(58) Field of Classification Search
None
See application file for complete search history.

(56) References Cited

U.S. PATENT DOCUMENTS

2012/0217069 A1   8/2012   Kawamura et al.
2014/0092415 A1*  4/2014   Yokoyama ............ G06F 3/1298
                                              358/1.13
(Continued)

FOREIGN PATENT DOCUMENTS

CN          1924787 A       3/2007
CN        101174349 A       5/2008
(Continued)

OTHER PUBLICATIONS

Chinese Office Action issued in connection with CN Appl. Ser. No. 202080050835.1 dated Feb. 6, 2023.

*Primary Examiner* — Andrew H Lam
(74) *Attorney, Agent, or Firm* — Foley & Lardner LLP

(57) ABSTRACT

An aspect of the present invention is a printer communicable with an external device in accordance with a predetermined communication protocol. The printer includes: a data reception unit configured to receive data containing a character string to be printed, from the external device; an acquisition unit configured to acquire extraction setting information that is information relating to a method of extracting the character string contained in the data that is received by the data reception unit; an extraction unit configured to, upon receiving the data from the external device, extract the character string from the received data, based on the extraction setting information that is acquired by the acquisition unit; and a print unit configured to print the character string that is extracted by the extraction unit, on a print medium.

9 Claims, 18 Drawing Sheets

(56) References Cited

U.S. PATENT DOCUMENTS

2018/0261052 A1* 9/2018 Iwamoto .................. G07G 1/06
2019/0369925 A1* 12/2019 Ishii .................. H04N 1/00323

FOREIGN PATENT DOCUMENTS

| | | |
|---|---|---|
| CN | 103017873 A | 4/2013 |
| JP | 2012-177561 A | 9/2012 |
| JP | 2013-132841 A | 7/2013 |
| JP | 2016-146117 A | 8/2016 |
| JP | 2018-147335 A | 9/2018 |

* cited by examiner

```
DATA
  ITEM NAME  (INP-DEV)                    ─105
  INPUT METHOD ○ FIXED
               ⊙ AT THE TIME OF ISSUANCE (DATA)
               ○ REFER/COMBINE
                  (DETAIL SETTING)        ─b3
─────────────────────────────────
  DATA   CHICKEN THIGHS 03
─────────────────────────────────
  DISPLAY
    FONT  × × × × ×
    SIZE  × ×  pt
```

FIG.6

FOR DATA FORMAT F1

FOR DATA FORMAT F2

SYSTEM AND METHOD FOR PRINTING USING EXTRACTION SETTING INFORMATION

FIELD

The present invention relates to a printer, a program, and an information processing system.

BACKGROUND

In selling products, such as meat or prepared food, by weight in stores, etc., the measured weight of a product is printed on a label, and this printed label is affixed on the product. In some publicly known systems, weight is measured by a scale, and the measured result is sent wirelessly to a printer that prints the received measured result on a label.

For example, Japanese Unexamined Patent Application Laid-Open No. 2012-177561 discloses a printing scale device including separate upper and lower casings that are vertically stacked. The upper casing is provided with a battery for supplying power to a load cell and a circuit unit, and a transmission unit for wirelessly transmitting a digital weight signal output from the circuit unit. The lower casing is provided with a reception unit, a control unit, a printer, and a power supply circuit. The reception unit wirelessly receives a digital weight signal. The control unit outputs print data based on the received digital weight signal. The printer prints predetermined items on a label or a receipt based on the print data. The power supply circuit supplies power to the control unit and the printer.

BRIEF SUMMARY

Technical Problem

Incidentally, conventional printers, as described above, receives data (digital weight signals) that have limited formats and cannot correctly print weight based on data formats other than the limited formats. This makes it difficult to flexibly cope with a change in the data format of data to be received by a printer, for example, because a printer driver should be modified.

In view of this, an object of the present invention is to enable a printer that receives data containing a target to be printed, to appropriately print the target without requiring complicated operation although a data format of the received data is changed.

Solution to Problem

An aspect of the present disclosure is a printer communicable with an external device in accordance with a predetermined communication protocol. The printer includes: a data reception unit configured to receive data containing a character string to be printed, from the external device; an acquisition unit configured to acquire extraction setting information that is information relating to a method of extracting the character string contained in the data that is received by the data reception unit; an extraction unit configured to, upon receiving the data from the external device, extract the character string from the received data, based on the extraction setting information that is acquired by the acquisition unit; and a print unit configured to print the character string that is extracted by the extraction unit, on a print medium.

Advantageous Effects

An aspect of the present invention enables a printer that receives data containing a target to be printed, to appropriately print the target without requiring complicated operation although a data format of the received data is changed.

BRIEF DESCRIPTION OF DRAWINGS

FIG. 6 shows a procedure of setting a method of inputting data in the information processing apparatus according to the first embodiment.

DETAILED DESCRIPTION

The term "object" in the following description is, for example, defined by a predetermined region within a print effective range of a print medium and contains one or both of a character string and a code as a target to be printed in the predetermined region. In determining print contents of a print medium by a user, an object is preferably movable within the print effective range. As an object moves within the print effective range, a character string and a code that are contained in the object also move. The target to be printed that is contained in an object is not limited to a character string and a code, and it can also include a figure, a symbol, a mark, etc.

(1) First Embodiment

(1-1) Overview of System

Figure 1:
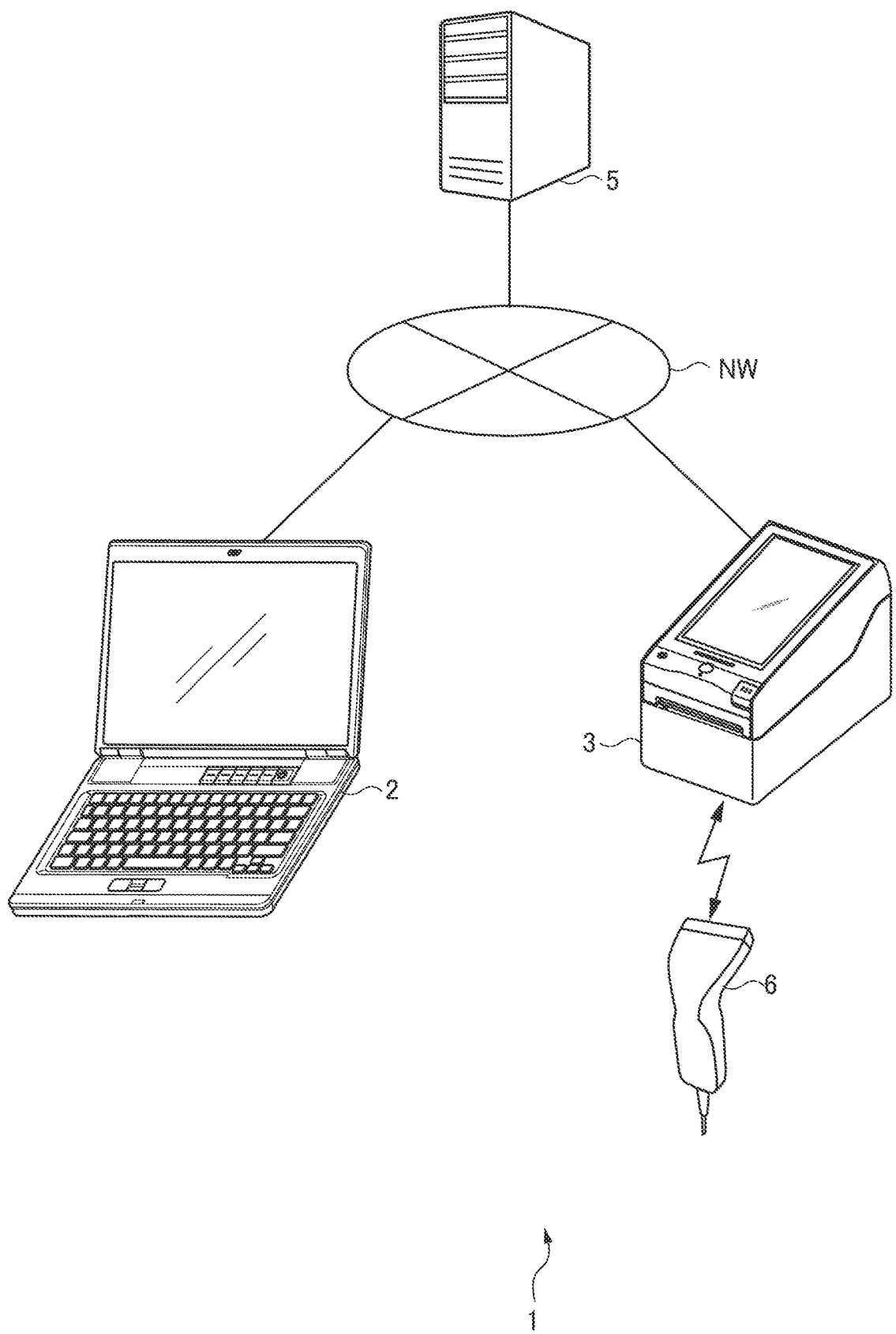
FIG. 1 is a system configuration diagram of an information processing system according to a first embodiment.
Figure 2:
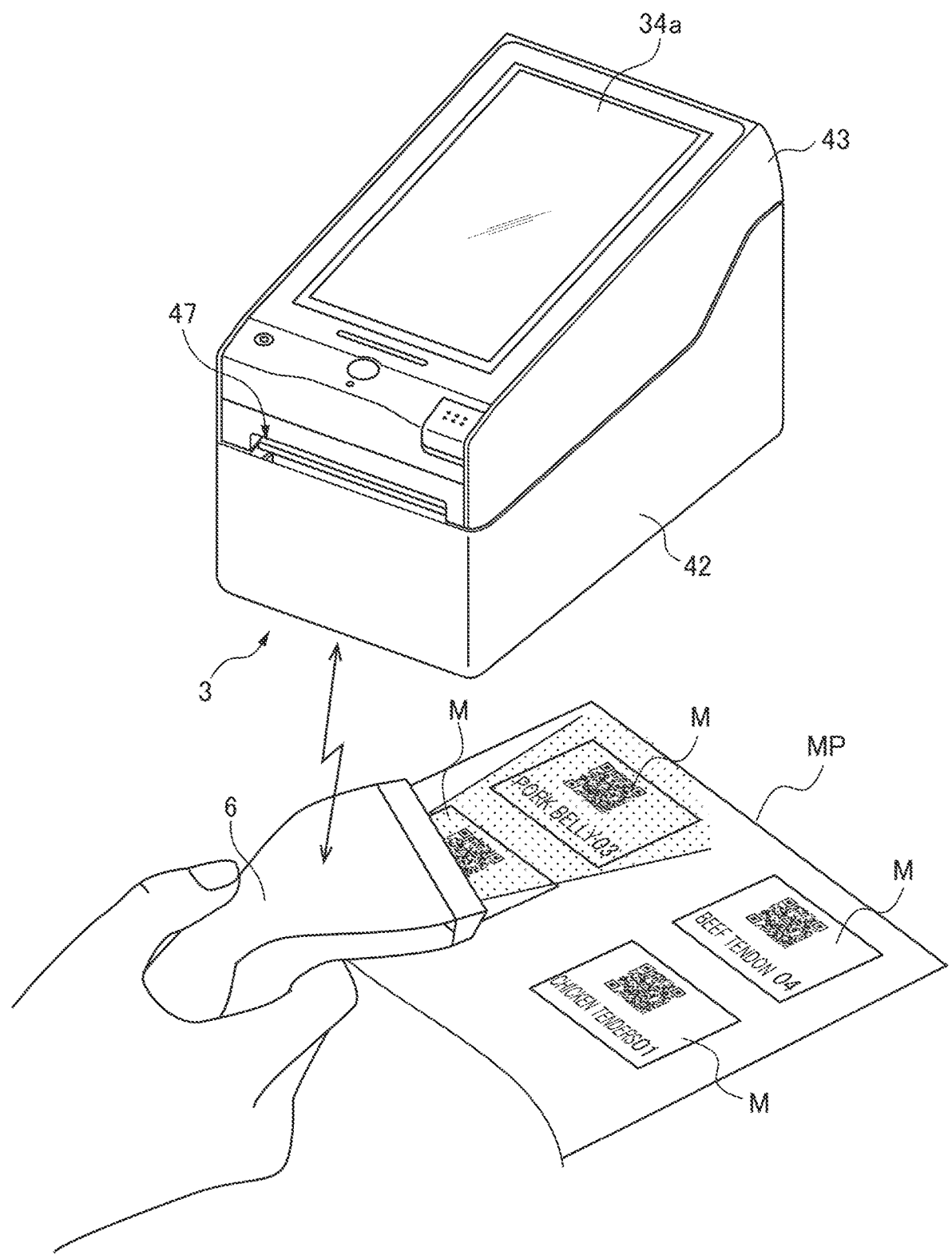
FIG. 2 shows a situation of issuing a label by a printer according to the first embodiment.
Figure 3:
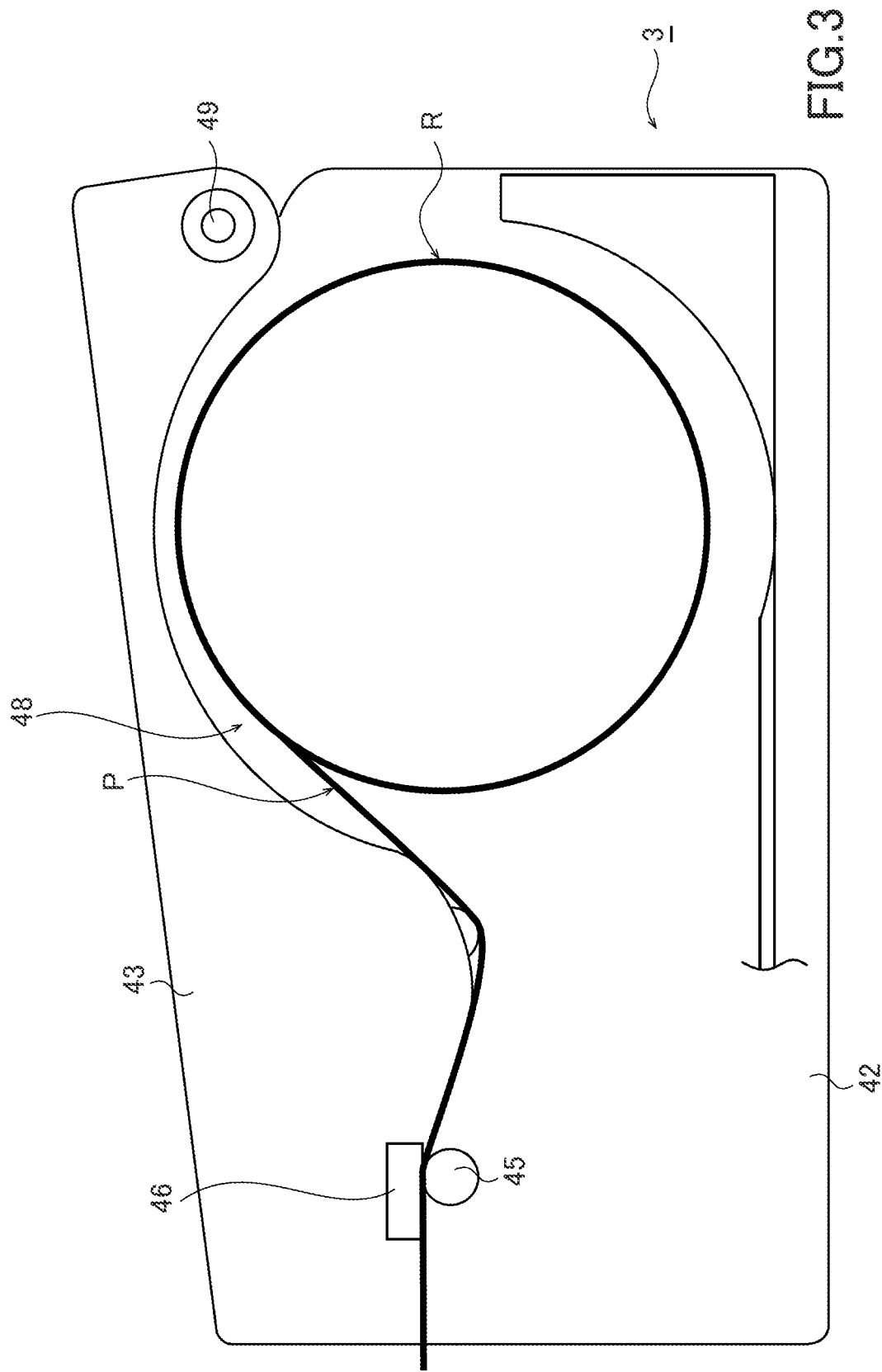
FIG. 3 illustrates printing operation of the printer according to the first embodiment.

Hereinafter, a data distribution system 1 of an embodiment of an information processing system of the present invention will be described with reference to FIGS. 1 to 3. FIG. 1 is a system configuration diagram of a data distribution system 1 according to this embodiment. FIG. 2 shows a situation of issuing a label by a printer of this embodiment. FIG. 3 illustrates printing operation of the printer according to this embodiment.

As shown in FIG. 1, in the data distribution system 1 of this embodiment, an information processing apparatus 2 and a printer 3 are connected to a server 5 via a network NW, such as the Internet or a local area network (LAN). The printer 3 and a scanner 6 (example of an external device) are able to wirelessly communicate with each other at short ranges. The short-range wireless communication method includes various known protocols and is not limited to a specific protocol, but for example, it may employ Bluetooth (registered trademark). Instead of Bluetooth (registered trademark), near field communication (NFC) may be used.

Although the scanner 6 is described as an example of an external device in the following description, the external device is not limited thereto and may be a local area network (LAN) device or the like. The external device is not limited to a device that wirelessly communicates with the printer 3 and may be a communication device that performs a wired communication by a universal serial bus (USB) cable or the like, or a device that is directly connected to a connector of the printer 3, such as a USB memory device.

In an example of this embodiment, the data distribution system 1 is operated by a seller who manages a store, and it is a system for issuing labels of products to be sold in the store. Although this embodiment describes a case of issuing labels in a store as an example, labels may be issued in a factory and so on.

The information processing apparatus 2 may be provided to a head office of the seller. The information processing apparatus 2 (hereinafter referred to as a "PC 2") is a computer, such as a personal computer or a tablet terminal. The printer 3 may be provided in the store. Although only one printer 3 is shown in FIG. 1, the number of the printers 3 is not limited to this, and the printer 3 may be provided to each store that is managed.

A basic layout design of a label is designed by using the PC 2 by the head office. On the basis of the layout design of the label provided from the head office, the label to be affixed to a product is issued by using the printer 3 in each store.

In addition to data of a layout design of a label, data of each item contained in a label, and a label production application program for creating a project file including each setting and so on (hereinafter appropriately referred to as a "label production application"), are installed in the PC 2.

The project file shows a management unit of data relating to a layout of a label. In accordance with a predetermined operation to the PC 2 by a user, the project file is converted into a format file in the PC 2, and the format file is distributed from the PC 2 to the printer 3 via the server 5. In more detail, in accordance with a predetermined operation of a user, the format file is uploaded from the information processing apparatus 2 to the server 5 and is downloaded from the server 5 to the printer 3 at predetermined timing.

A label issuance application program, which is adapted for issuing labels based on the format file acquired from the PC 2 (hereinafter appropriately referred to as a "label issuance application"), is installed in the printer 3. Executing the label issuance application allows for selecting issuance data from the downloaded format file in accordance with a user operation. The label issuance application modifies data (character string) of at least one or more items in the selected issuance data, into data (character string) obtained from the scanner 6, before issuing a label.

Specifically, as shown in FIG. 2, a mark display paper MP on which one or multiple print marks M are printed is prepared in the store in advance. Each print mark M contains a two-dimensional code and visible characters (human readable) corresponding to the two-dimensional code (for example, "PORK BELLY 03"). In response to scanning one of the print marks M by a user, the scanner 6 reads the two-dimensional code, and the printer 3 obtains the read data via wireless communication with the scanner 6.

A label is issued by reading the print mark M, and thus, it is not necessary to store various data (character string) corresponding to each item in the printer 3. In addition, after the format file is acquired once, labels for various products are able to be issued offline by the printer 3.

Details of the project file and the issuance data will be described later.

In the data distribution system 1 of this embodiment, an exemplary thermal printer 3 will be described with reference to FIGS. 2 and 3, although the embodiment is not intended to limit the form, the printing method, etc., of the printer 3.

As shown in FIG. 2, the printer 3 of this embodiment includes a case 42 and a cover 43, and a display panel 34a is disposed on the top of the cover 43. The display panel 34a is, for example, a liquid crystal display panel with touch panel function, and provides an input-output interface to a user in a state in which the cover 43 is closed.

As shown in FIG. 3, the printer 3 contains a rolled paper R in a housing chamber 48. The rolled paper R is composed of a rolled continuous paper P having multiple labels that are temporarily attached on a strip release paper at a predetermined interval. In one example, a label has a thermal color developing layer that is formed on a surface and has an adhesive layer that is formed on a back surface, and the adhesive layer adheres on a release surface of the release paper.

The cover 43 is swingable on an axis part 49 at an end, relative to the case 42, to open and close the housing chamber 48. In order to house the rolled paper R in the housing chamber 48, the cover 43 is opened.

As shown in FIG. 3, a platen roller 45 is axially supported in a manner rotatable in forward and reverse directions, on the downstream in the feeding direction of the case 42. The platen roller 45 is a feeding unit for feeding the continuous paper P rolled out from the rolled paper R and is formed in such a manner as to extend in the width direction of the continuous paper P. The platen roller 45 is driven by a stepping motor (not shown) or the like that is mechanically coupled thereto.

The printer 3 receives the format file from the server 5 and creates print data based on a user operation, as described later.

A thermal head 46 is disposed to the cover 43 so as to face the platen roller 45 while the cover 43 is closed and prints a label of the continuous paper P based on the print data. The thermal head 46 includes a printing surface on which multiple heating resistors (heating elements) that generate heat by electric conduction are arranged along the width direction (line direction) of the continuous paper P. The thermal head 46 performs printing by selectively energizing the heating elements in accordance with each line data of the print data to change color of the thermal color developing layer of the label.

The continuous paper P that has been printed by the thermal head 46 is discharged to the outside of the printer 3 from a discharge port 47 (refer to FIG. 2) as an opening between the cover 43 and the case 42 in the state in which the cover 43 is closed (that is, a label is issued). An employee in the store peels off a label from the release paper of the continuous paper P discharged from the discharge port 47 and affixes it to a product in the store.

(1-2) Flow of Data Distribution

Next, a series of steps from creation of a project file by the PC 2 to distribution of the format data to the printer 3 will be described with reference to FIGS. 4 to 10.

Figure 4:
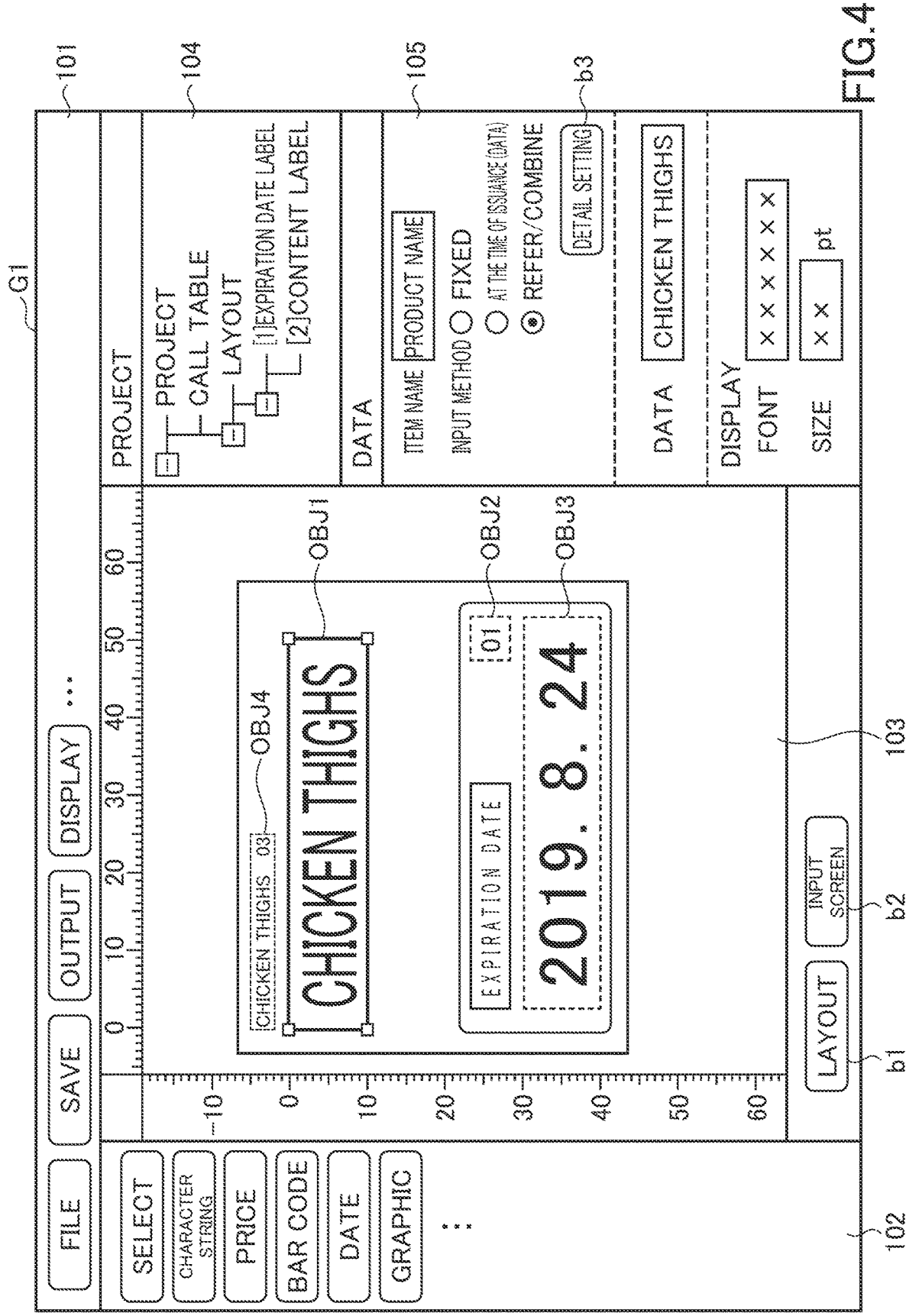
FIG. 4 shows an example of a project file creation screen of an information processing apparatus according to the first embodiment.
Figure 5:
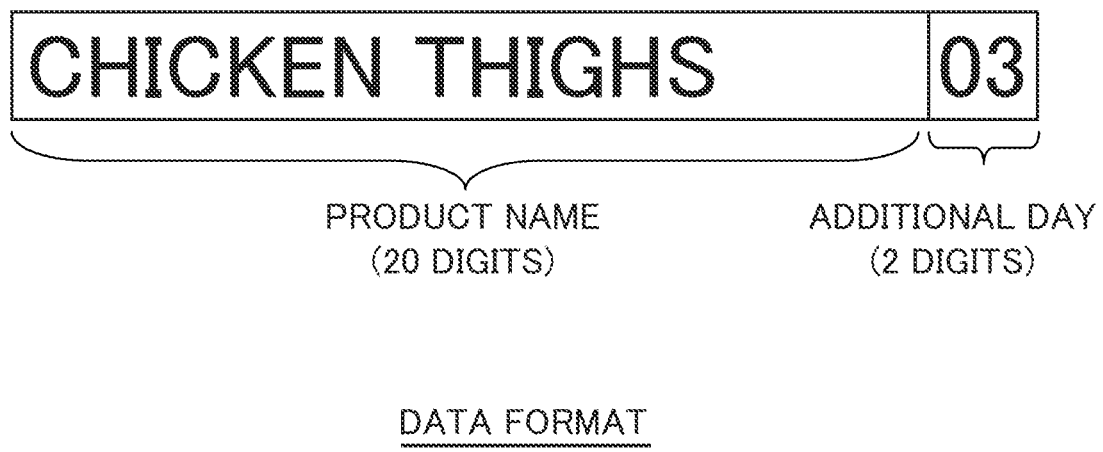
FIG. 5 shows an example of a data format of data obtained from a scanner in the first embodiment.
Figure 7:
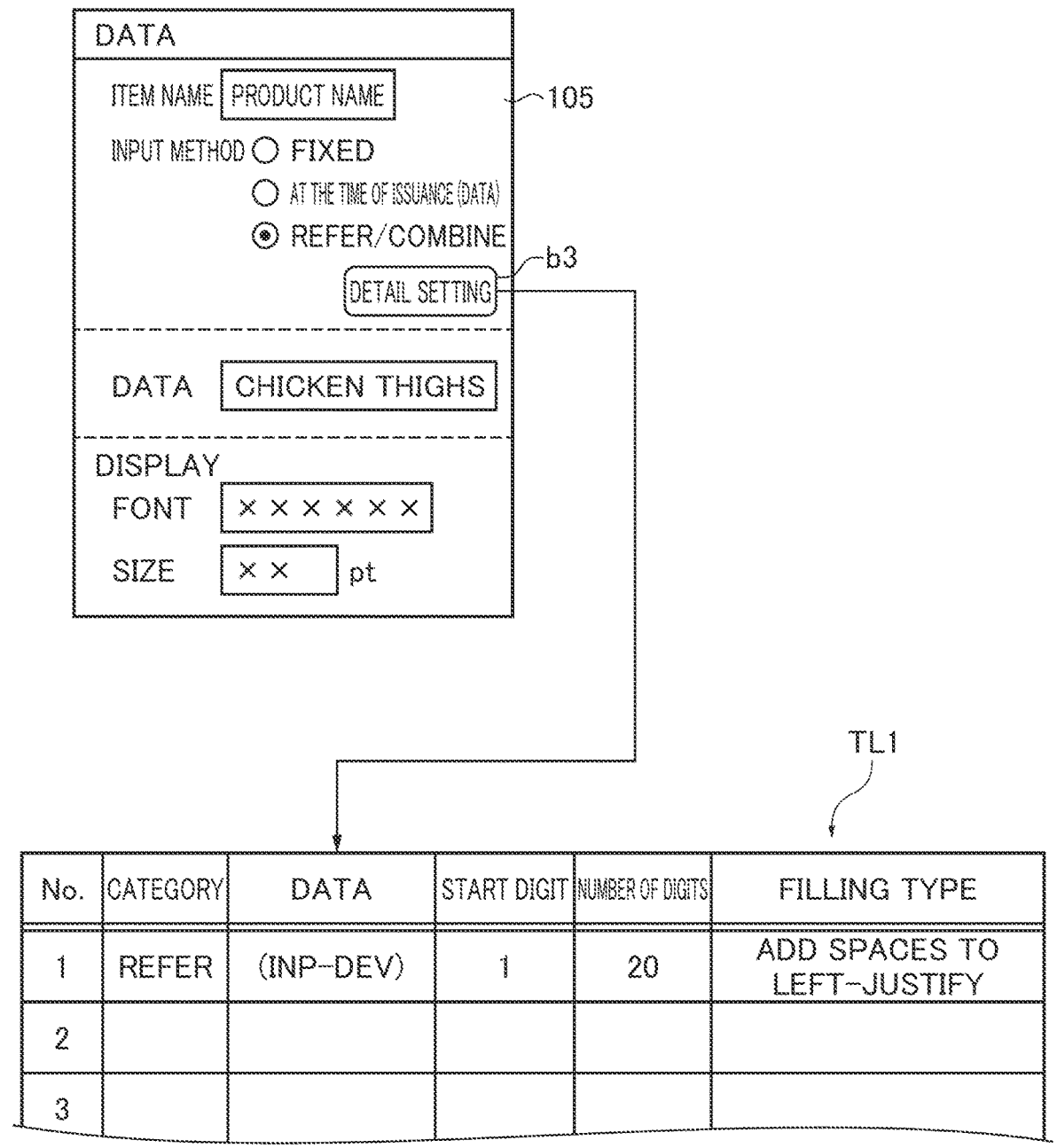
FIG. 7 shows a procedure of setting a method of inputting data in the information processing apparatus according to the first embodiment.
Figure 8:
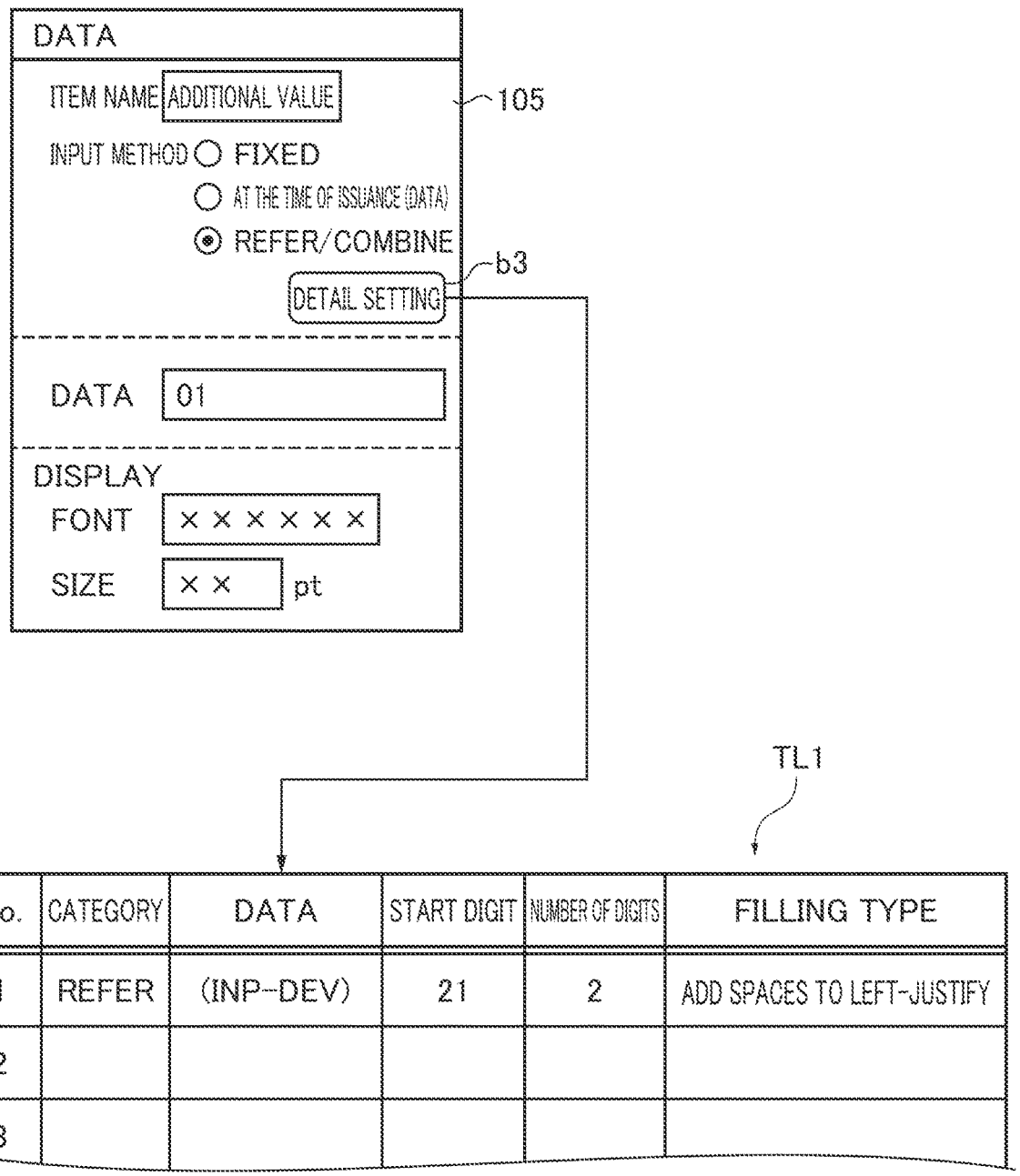
FIG. 8 shows a procedure of setting a method of inputting data in the information processing apparatus according to the first embodiment.
Figure 9:
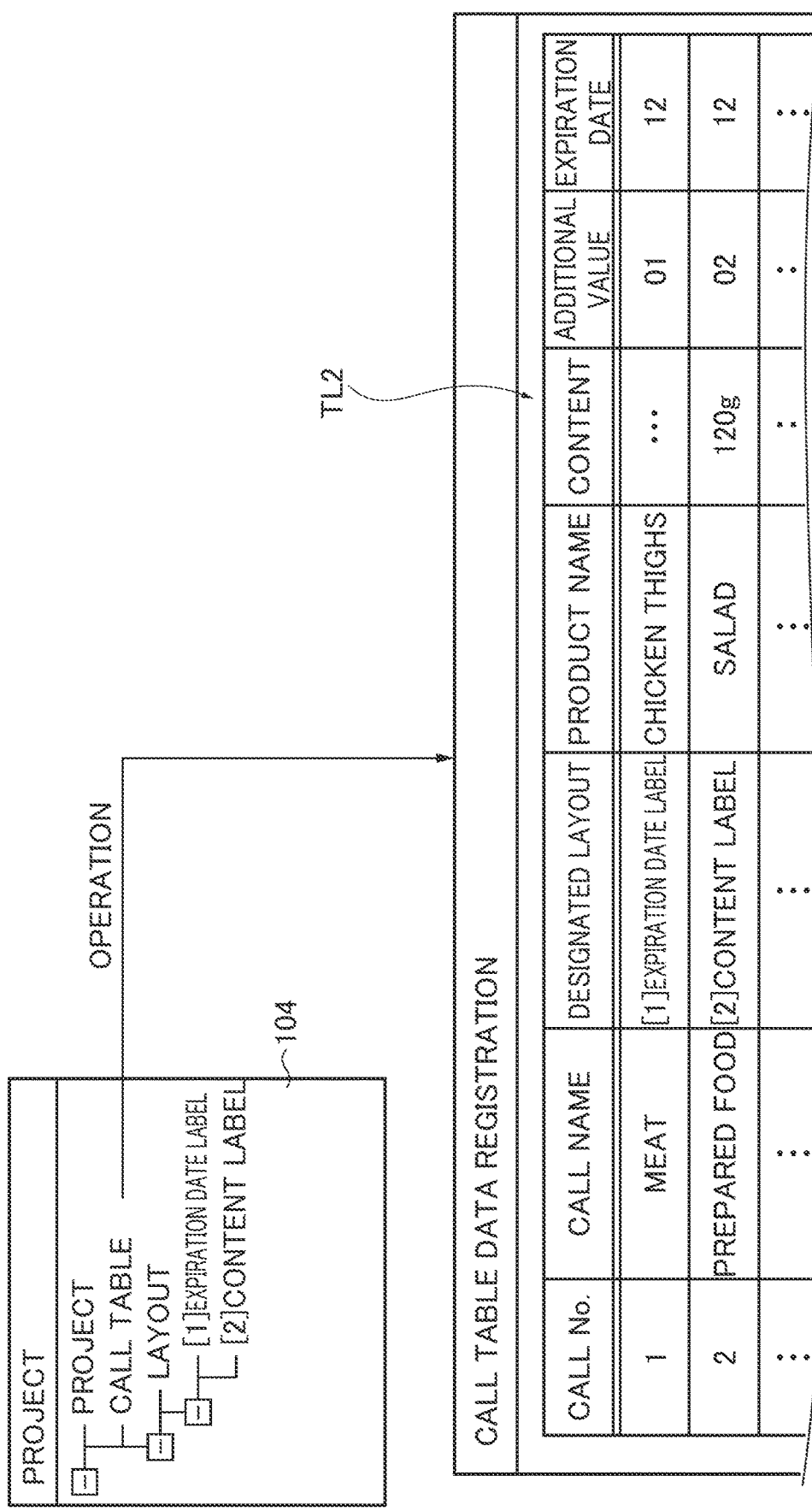
FIG. 9 shows a procedure of displaying a call table in the information processing apparatus according to the first embodiment.
Figure 10:
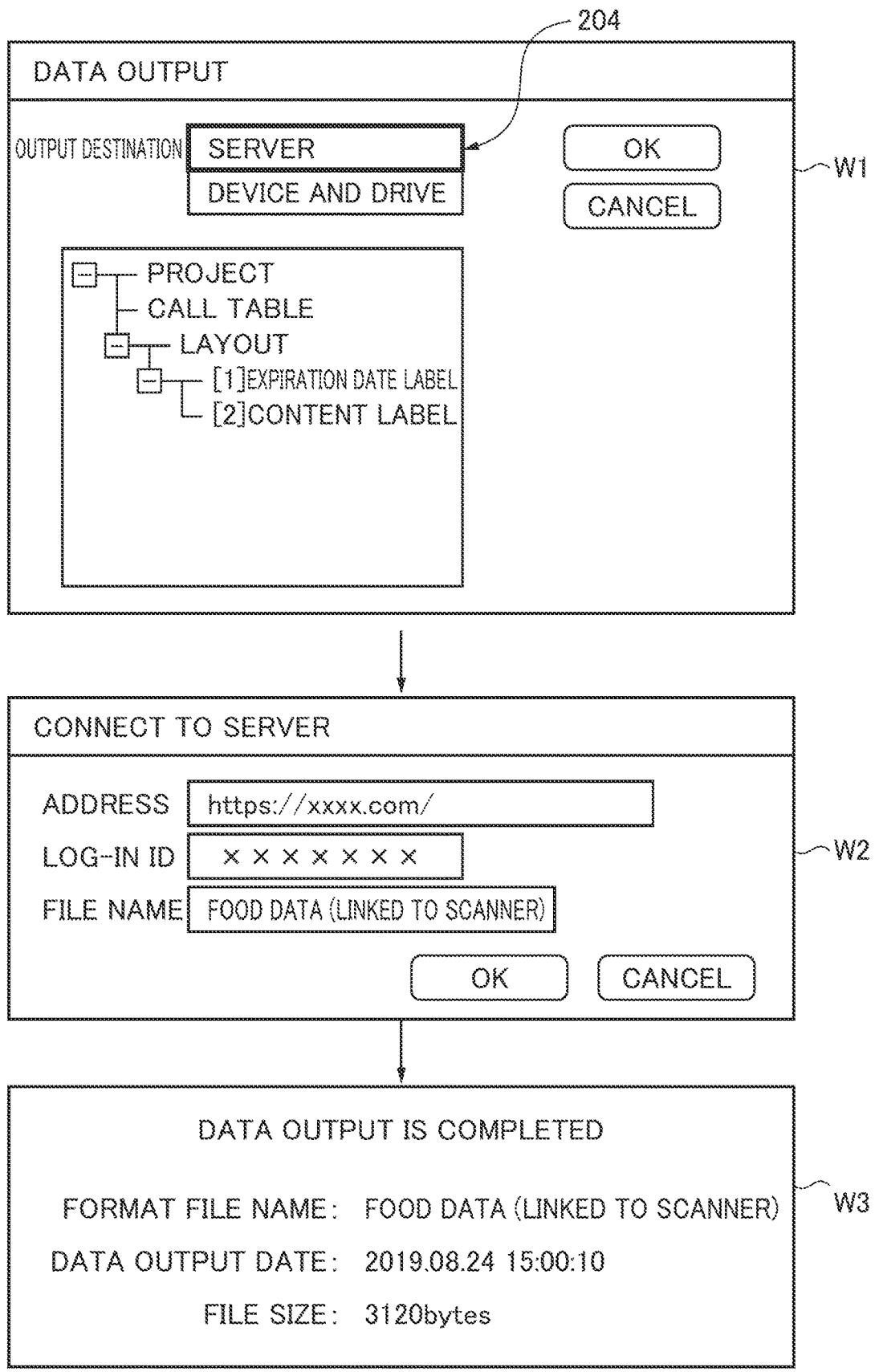
FIG. 10 shows a procedure of uploading a format file to a server in the information processing apparatus according to the first embodiment.

FIG. 4 shows an example of a project file creation screen of the PC 2. FIG. 5 shows an example of a data format of data obtained from the scanner 6 in this embodiment. FIGS. 6 to 8 each show a procedure of setting a method of inputting data in the PC 2. FIG. 9 shows a procedure of displaying a call table on the PC 2. FIG. 10 shows a procedure of uploading a format file to a server by the PC 2.

FIG. 4 shows an example of a PC screen G1 (project file creation screen) that appears on the PC 2 when the label production application is activated. A user can design a label to be issued by the printer 3, by setting an object to be placed within a print effective range of the label in the project file creation screen.

In the label production application, data is managed with a project file. As described above, the project file is created by the label production application and corresponds to a management unit of data relating to a layout of a label.

As shown in FIG. 4, the PC screen G1 contains instruction buttons 101, object buttons 102, a design window 103, a project setting section 104, and an object property setting section 105.

The project setting section 104 shows data contained in the project file, in the form of a hierarchical structure. As shown by this hierarchical structure, the project file contains a call table and layout data.

It is possible to read the project file from a storage, store the project file in the storage, convert the project file into a format file and upload the format file to the server 5, or perform other operations by operating a button among the instruction buttons 101.

The call table (example of print data) is data for printing a label with the use of the label issuance application in the printer 3.

The layout data is design data for issuing a label by the printer 3, in combination with the call table, and for example, it is displayed in the design window 103 of the PC screen G1 at the time of editing.

The design window 103 corresponds to a label creation and editing area, and an object is arranged or moved in this creation and editing area in designing a label. That is, the design window 103 is used for designing a layout of a label. This embodiment describes an example of designing a label containing four objects as follows: an object OBJ1 corresponding to an item "PRODUCT NAME", an object OBJ2 corresponding to an item "ADDITIONAL VALUE", an object OBJ3 being a date object corresponding to an item "EXPIRATION DATE", and an object OBJ4 corresponding to an item "(INP-DEV)" (which will be described later).

In response to operating a button b2 ("INPUT SCREEN"), a window (not shown) for inputting a character string or a code contained in each object appears instead of the design window 103. Operating a button b1 ("LAYOUT") in the state in which this window is displayed, causes the display to return to the design window 103.

The additional value is added to a base date of the printer 3, as a value of date that is set in the date object of the layout data created by the label production application.

As to a product having an expiration date, there are cases where it is difficult for the head office, where a layout design of a label is created, to set the expiration date of the product that is directly distributed to a store. In such cases, the expiration date of the product is determined by adding the additional value to the base date of the printer 3.

The unit of the additional value can be selected from year, month, day, and time. In the following description, the additional value in units of days is appropriately represented as an "additional day".

The object buttons 102 are operated to select and move an object in the design window 103 or create a new object. The object buttons 102 allow for selecting objects such as a character string object, a price object, a bar code object, a date object, and a graphic object. Various settings for the object can be performed in the object property setting section 105.

In the example shown in FIG. 4, various settings for the selected object OBJ1 can be performed in the object property setting section 105. In one example, an item to be used in the layout design in the design window 103 is set by an item name (in this example, "PRODUCT NAME") in the object property setting section 105. The input method can be selected from "FIXED", "AT THE TIME OF ISSUANCE (DATA)", and "REFER/COMBINE".

When the input method "FIXED" is selected, it is set so that the value (in this example, "CHICKEN THIGHS") set in a "DATA" field will be printed. When the input method "AT THE TIME OF ISSUANCE (DATA)" is selected, an initial value that is set in the "DATA" field can be changed by the label issuance application of the printer 3. When the input method "REFER/COMBINE" is selected, data of another item can be referred to or data of multiple items can be combined.

In the case in which the "REFER/COMBINE" in the object property setting section 105 is selected, detail setting can be performed by operating a detail setting button b3. In this embodiment, setting for obtaining data from the scanner 6 is made by this detail setting.

Hereinafter, a procedure of setting for obtaining data from the scanner 6 will be described with reference to FIGS. 5 to 8.

This exemplary procedure assumes that data obtained from the scanner 6 has a data format shown in FIG. 5. That is, as shown in FIG. 5, data that is read by the scanner 6 is assumed to have the following data format.

[Data Format of Read Data]
Number of digits: 22
Data from the 1st digit to the 20th digit is for a value of "PRODUCT NAME".
Data of two digits of the 21st and the 22nd digits is for a value of "ADDITIONAL VALUE".

In a state in which the object OBJ4 corresponding to the item name "(INP-DEV)" is selected in the design window 103 of the PC screen G1, the object property setting section 105 is displayed as shown in FIG. 6. The data corresponding to the item name "(INP-DEV)" is read data that the printer 3 obtains from the scanner 6 at the time of issuing a label, and the input method "AT THE TIME OF ISSUANCE (DATA)" is selected. The character string that is input in the "DATA" field of the object property setting section 105 in FIG. 6 is merely an initial value.

In a state in which the object OBJ1 corresponding to the item name "PRODUCT NAME" is selected in the design window 103 of the PC screen G1, the object property setting section 105 is displayed as shown in FIG. 7. In this state, in response to selecting the input method "REFER/COMBINE" and operating the detail setting button b3, a setting table TL1 including "CATEGORY", "DATA", "START DIGIT", "NUMBER OF DIGITS", and "FILLING TYPE", appears.

The value in the "CATEGORY" field of the setting table TL1 shows "FIXED" or "REFER". The value in the "DATA" field is data to be referred to or a value input by a user. The value in the "START DIGIT" field designates the digit from which the data is started to be referred to. The value in the "NUMBER OF DIGITS" field designates the range of digits from the start digit of data to be referred to. The value in the "FILLING TYPE" field designates a method of filling the digits in the case in which the referred data does not have full digits.

The value "(INP-DEV)" in the "DATA" field of the setting table TL1 shown in FIG. 7 means that data obtained from the scanner 6 is referred to at the time of issuing a label.

The value "ADD SPACES TO LEFT-JUSTIFY" in the "FILLING TYPE" field of the setting table TL1 shown in FIG. 7 means that en spaces in the number of remaining digits are to be added after actual data that does not have full input digits.

For the value in the "FILLING TYPE" field, in addition to the "ADD SPACES TO LEFT-JUSTIFY", "ADD SPACES TO RIGHT-JUSTIFY" or "ADD ZEROS TO RIGHT-JUSTIFY" can be input. The value "ADD SPACES TO RIGHT-JUSTIFY" means that en spaces of the number of remaining digits are to be added before actual data that does not have full input digits. The value "ADD ZEROS TO RIGHT-JUSTIFY" means that zeros of the number of remaining digits are to be added before actual data that does not have full input digits.

In the example shown in FIG. 7, in order to input a character string of a product name from read data having the data format in FIG. 5, the value of each field of the "START DIGIT" and the "NUMBER OF DIGITS" input in the setting table TL1 is set so that read data of 20 digits from the 1st digit will be referred to (or extracted).

In a state in which the object OBJ2 corresponding to the item name "ADDITIONAL VALUE" is selected in the design window 103 of the PC screen G1, the object property setting section 105 is displayed as shown in FIG. 8. In this state, in response to selecting the input method "REFER/COMBINE" and operating the detail setting button b3, a setting table TL1 including "CATEGORY", "DATA", "START DIGIT", "NUMBER OF DIGITS", and "FILLING TYPE", appears.

As in the case of the data for the item name "PRODUCT NAME", it is set so that data obtained from the scanner 6 will be referred to as the data for the item name "ADDITIONAL VALUE". In the example shown in FIG. 8, in order to input a character string of the additional value from read data having the data format in FIG. 5, the value of each field of the "START DIGIT" and the "NUMBER OF DIGITS" input in the setting table TL1 is set so that read data of two digits from the 21st digit will be referred to (or extracted).

The setting tables TL1 shown as examples in FIGS. 7 and 8 are examples of extraction setting information for a character string contained in data received from the scanner 6.

In the case of changing the data format of read data from the format of the example shown in FIG. 5, the value of each field of the "START DIGIT" and the "NUMBER OF DIGITS" corresponding to each item of the "PRODUCT NAME" and the "ADDITIONAL VALUE" should be changed accordingly.

Next, details of the call table will be described with reference to FIG. 9.

The call table is a data table to allow for registering data for printing a label, with respect to preliminarily defined items.

As shown in FIG. 9, a call table TL2 is displayed by operating (for example, double clicking) the "CALL TABLE" in the project setting section 104. This exemplary call table TL2 is provided with, in addition to fields of "CALL No.", "CALL NAME", and "DESIGNATED LAYOUT", fields of defined four item names of "PRODUCT NAME", "CONTENT", "ADDITIONAL VALUE", and "EXPIRATION DATE".

Each record in the call table TL2 shows a label layout and data (character string) of each defined item name for issuing one kind of label. The data of each record will be hereinafter referred to as "issuance data". A user can associate the layout of a label with a character string corresponding to each item name by inputting a value (character string) corresponding to each item name in the call table TL2, but these values input in this step are initial values.

Specifically, in the case of selecting the input method "FIXED" in the object property setting section 105 (refer to FIG. 4), input values in the call table TL2 are reflected at the time of issuing a label as they are. On the other hand, in the case of selecting the input method "AT THE TIME OF ISSUANCE (DATA)" or the input method "REFER/COMBINE", input values in the call table TL2 may not be reflected at the time of issuing a label as they are.

In the case of selecting the input method "REFER/COMBINE", as shown in FIGS. 7 and 8, data that is obtained from the scanner 6 is referred to. Thus, input values in the call table TL2 are merely initial values for checking them in the design window 103.

The value in each field of the "CALL No." and the "CALL NAME" in the call table TL2 is provided in order to call issuance data by the label issuance application of the printer 3.

Multiple records may not be provided to the call table TL2, and instead, only one record (that is, single issuance data) may be provided.

The value in the "DESIGNATED LAYOUT" field in the call table TL2 shows one layout data that is created in the design window 103 (refer to FIG. 4) or one of multiple layout data created therein. In this example, the value in the "DESIGNATED LAYOUT" field shows that each issuance data corresponds to one of two layout data that are already created as "[1] EXPIRATION DATE LABEL" and "[2] CONTENT LABEL".

In one example, the issuance data corresponding to the record of the call No.: 1 (call name: "MEAT") in the call table TL2 is shown in the label design in the design window 103 displayed on the PC screen G1 in FIG. 4.

In this example, the label design in the design window 103 corresponds to the value ([1] EXPIRATION DATE LABEL) in the "DESIGNATED LAYOUT" field of the record of the call No.: 1. The character string in the object OBJ1 corresponding to the product name corresponds to the value in the "PRODUCT NAME" field of the record of the call No.: 1 in the call table TL2. The character string in the object OBJ2 corresponding to the additional value corresponds to the value in the "ADDITIONAL VALUE" field of the record of the call No.: 1 in the call table TL2.

The value in the "EXPIRATION DATE" field of the record corresponding to the call No.: 1 shows a maximum number of digits of the date in the object OBJ3, which is a date object corresponding to the expiration date. In the label design of the design window 103, for example, the base date of the PC 2 or the current date is shown as the date in the object OBJ3 corresponding to the expiration date. At the time the printer 3 issues a label, the value in the object OBJ3 is changed to a date that is obtained by adding the value in the "ADDITIONAL VALUE" field to the base date set by the label issuance application of the printer 3.

A user of the PC 2 can design a label having a different layout, or a label having the same layout but having a different print content of each item, by registering data in the call table TL2. In the example shown in the call table TL2 in FIG. 9, a label that is issued based on the call No.: 1 differs from a label that is issued based on the call No. 2, in the layout and the print content.

As described above, the label production application of the PC 2 allows for creating the layout data and the call table. In response to operating the output button among the instruction buttons 101, a project file containing the layout data and the call table is created, and also a format file is created by converting the project file. The format file is uploaded to the server 5 in accordance with a predetermined operation.

Specifically, in response to operating the output button among the instruction buttons 101, a data output window W1 appears, as shown in FIG. 10. The window W1 contains an output destination selecting section 204 that enables selecting a storage ("DEVICE AND DRIVE") in the PC 2 or a server 5 ("SERVER") as the output destination. In response to selecting the "SERVER" in this section, a window W2 appears. In the window W2, an address (URL) of the server 5, a log-in ID, and a file name of the format file are input, and an OK button is operated. Thus, the format file is uploaded (window W3). In the window W3, password authentication may be performed for the sake of safety.

In the example shown in FIG. 10, a format file named "FOOD DATA (LINKED TO SCANNER)" is uploaded to the server 5.

(1-3) Issuance of Label

Figure 11:
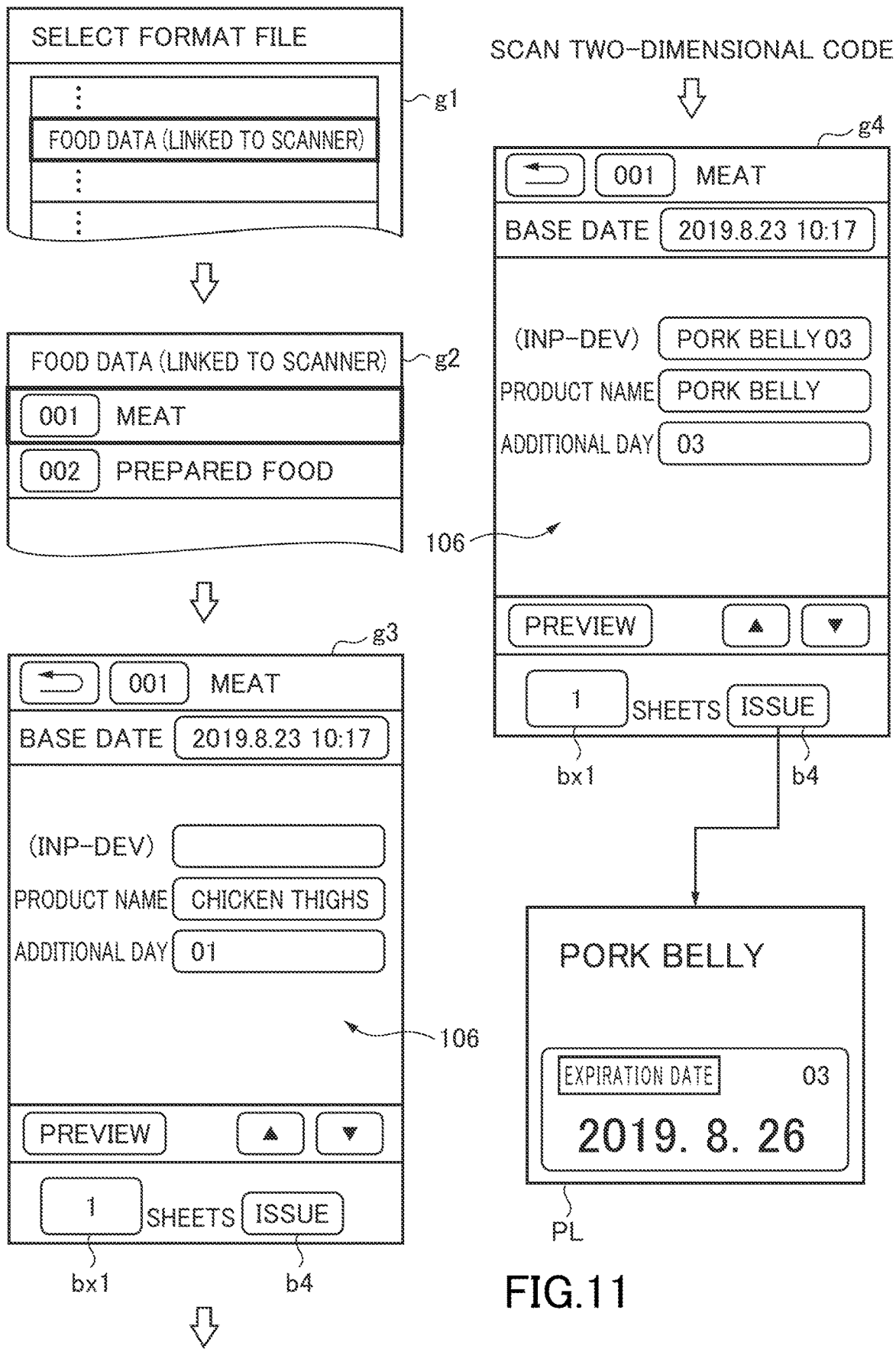
FIG. 11 shows transition of screens displayed on the printer according to the first embodiment.

Hereinafter, a procedure of issuing a label by the printer 3 will be described with reference to FIG. 11. FIG. 11 shows transition of screens displayed on the printer 3 according to this embodiment.

First, the label issuance application of the printer 3 is activated, and operation for downloading a format file from the server 5 is performed. Then, as shown in a printer screen g1 in FIG. 11, a format file "FOOD DATA (LINKED TO SCANNER)" corresponding to the label that a user desires to issue is selected from downloaded format files.

A printer screen g2 subsequently appears showing a list of call numbers and call names (that is, a list containing each record in the call table TL2) in the selected format file. Operation for selecting one pair of the call numbers and the call names from this list can be performed. In this state, for example, in response to selecting the call No.: 001 and the call name "MEAT", the issuance data of the record corresponding to the call No.: 1 in the call table in FIG. 9 is called, and a printer screen g3 appears.

The printer screen g3 contains a base date of the printer 3, an issuance data display section 106, an input box bx1 for inputting the number of sheets to be issued, and an issue button b4.

The issuance data display section 106 shows an initial value of each item of the issuance data corresponding to the call No.: 1. Specifically, the issuance data display section 106 shows a character string "CHICKEN THIGHS" that corresponds to the item "PRODUCT NAME" and also shows a character string "01" that corresponds the item "ADDITIONAL VALUE". In addition, the issuance data display section 106 is provided with a field "(INP-DEV)" that allows for referring to data obtained from the scanner 6.

Operating the issue button b4 in the printer screen g3 enables receiving read data from the scanner 6 as reference data. At this time, in response to executing scanning of one of the print marks M on the mark display paper MP by a user using the scanner 6, as shown in FIG. 2, a printer screen g4 in FIG. 11 appears.

The printer screen g4 shows the read data that is obtained from the scanner 6, in the field "(INP-DEV)" in the issuance data display section 106. At the same time, this read data is referred to, whereby the value of each item name "PRODUCT NAME" and "ADDITIONAL VALUE" is updated from the value shown in the printer screen g3.

In the example of this embodiment, the value of each item name "PRODUCT NAME" and "ADDITIONAL VALUE" is extracted from the read data of the scanner 6, in accordance with the setting tables TL1 shown in FIGS. 7 and 8.

Operating the issue button b4 in the printer screen g4 causes a label to be issued. A label PL that is thus issued is shown in FIG. 11.

The layout of the label PL shown in FIG. 11 is the same as that shown in the design window 103 in FIG. 4, but the value of the item corresponding to each object reflects the value shown in the issuance data display section 106 in the printer screen g4. Herein, the expiration date is a value (2019.8.26) that is obtained by adding the additional value ("3") to the base date (2019.8.23) of the printer 3.

(1-4) Configuration of Data Distribution System 1

Next, a configuration of the PC 2, the printer 3, the scanner 6, and the server 5 included in the data distribution system 1 will be described with reference to FIG. 12.

(1-4-1) PC 2

Figure 12:
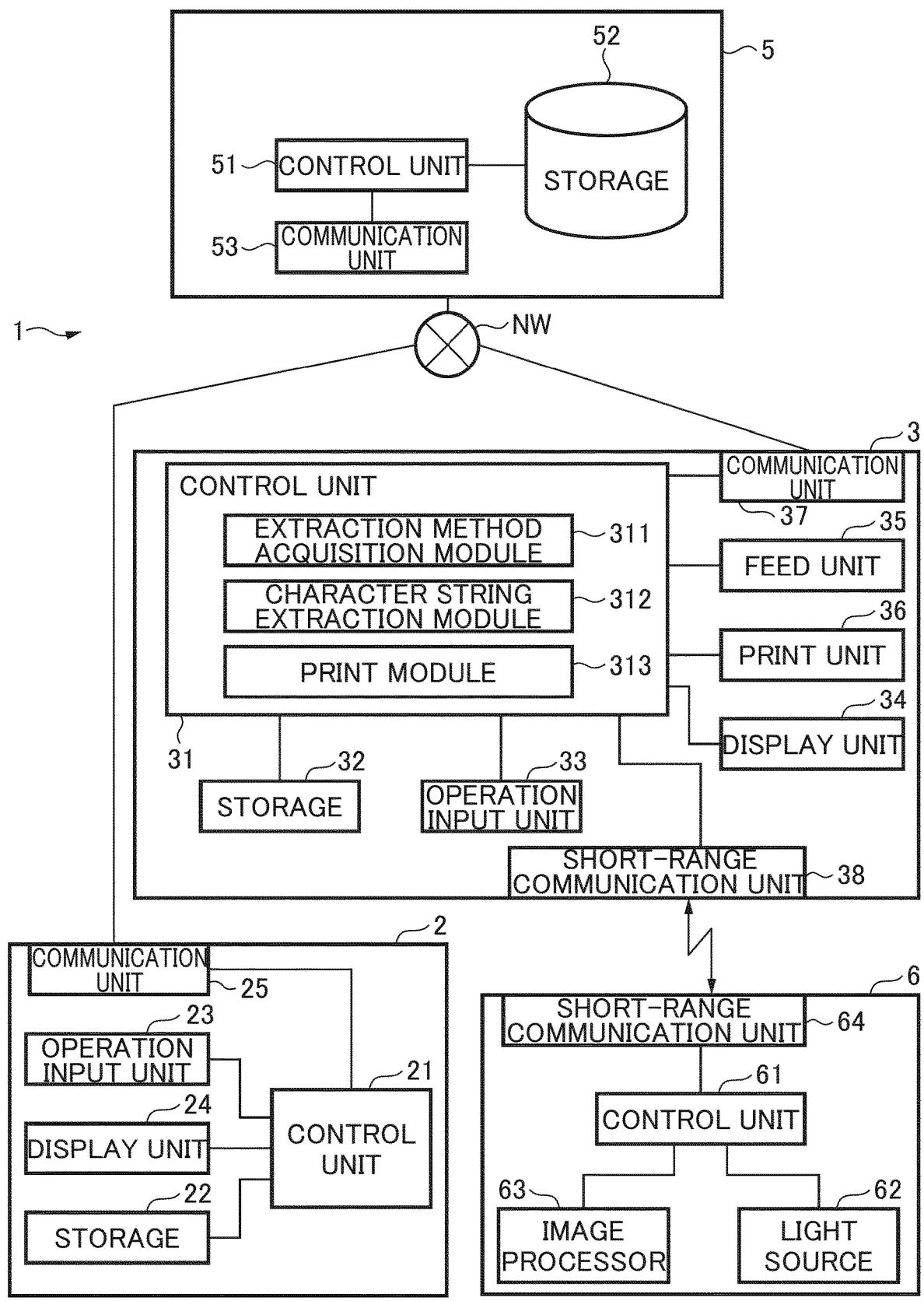
FIG. 12 is a block diagram of each device of a data distribution system according to the first embodiment.

As shown in FIG. 12, the PC 2 includes a control unit 21, a storage 22, an operation input unit 23, a display unit 24, and a communication unit 25. The communication unit 25 is a communication interface for communicating with the server 5.

The control unit 21 is composed mainly of a microprocessor and controls the whole PC 2. In one example, the microprocessor contained in the control unit 21 loads and executes the label production application program recorded in the storage 22 and displays the execution result on the display unit 24.

The storage 22 is a non-volatile memory and may be a solid state drive (SSD), such as a flash memory. The storage 22 stores, in addition to the label production application program, a project file that is created by executing the label production application, and so on.

The label production application provides a graphical user interface (GUI) in the project file creation screen, and it creates a project file containing layout data and a call table, updates and stores the project file in the storage 22, in accordance with a user operation to the operation input unit 23. This processing involves the following operations (1-i) to (1-iii).

(1-i) Create layout data by arranging objects corresponding to items of a label within a print effective range of the label, and update the layout data.

(1-ii) Perform various settings to each object (including setting of the input methods of data shown in the examples in FIGS. 7 and 8).

(1-iii) Create a call table to associate layout data and a value (character string) of each item in each issuance data corresponding to the call number.

Moreover, the label production application converts the project file into a format file and uploads the format file to the server 5 via the communication unit 25.

The display unit 24 has, for example, a liquid crystal display panel on which an execution result of the label production application is displayed.

The operation input unit 23 has an input device, such as a pointing device or a touch panel. In a case in which the display unit 24 has a display panel for touch panel input, the display unit 24 is formed as a part of the operation input unit 23.

(1-4-2) Printer 3

As shown in FIG. 12, the printer 3 includes a control unit 31, a storage 32, an operation input unit 33, a display unit 34, a feed unit 35, a print unit 36, a communication unit 37, and a short-range communication unit 38. The communication unit 37 is a communication interface for communicating with the server 5. The short-range communication unit 38 is a communication interface for wirelessly communicating with the scanner 6 in accordance with Bluetooth (registered trademark), and it is an example of a data reception unit.

The control unit 31 is an example of an acquisition unit and an extraction unit. The storage 32 is an example of a storage.

The control unit 31 is composed mainly of a microprocessor and controls the whole printer 3. The storage 32 is a non-volatile memory and may be an SSD, such as a flash memory.

In one example, the microprocessor contained in the control unit 31 loads and executes firmware and the label issuance application program recorded in the storage 32.

The control unit 31 requests the server 5 to transmit a format file, receives the format file sent in response to this request, via the communication unit 37, and stores it in the storage 32. Time when the control unit 31 requests the server 5 to transmit a format file is not limited, but may be, for example, time of activating the printer 3, a predetermined time each day, or time when a user performs a specific downloading operation.

The display unit 34 has a display panel 34*a* (refer to FIG. 2) and shows an execution result of the label issuance application on the display panel 34*a*. The operation input unit 33 includes a touch panel input that is provided to the display panel 34*a* and includes an input circuit thereof.

The label issuance application has an extraction method acquisition module 311 (example of an acquisition unit) and a character string extraction module 312 (example of an extraction unit).

The extraction method acquisition module 311 executes the following processing.

(2-i) Identify a format file in the format files stored in the storage 32, based on user operation.

(2-ii) Read (Call) issuance data corresponding to a call number, from the identified format file, based on selection input of the call number by a user.

(2-iii) Acquire a setting table TL1 (refer to FIGS. 7 and 8, example of extraction setting information) by causing the communication unit 37 to receive the format file.

As described above, setting of the method for inputting data corresponding to each item is selected from "FIXED", "AT THE TIME OF ISSUANCE (DATA)", and "REFER/COMBINE". In the example of this embodiment, setting of the method for inputting data corresponding to each of the items "PRODUCT NAME" and "ADDITIONAL VALUE" is as shown in the setting tables TL1 in FIGS. 7 and 8.

The character string extraction module 312 executes the following processing.

(3-i) In the case in which the data input method is set so that "(INP-DEV)" will be referred to, control the short-range communication unit 38 to establish a wireless communication with the scanner 6 in accordance with Bluetooth (registered trademark).

(3-ii) In response to the short-range communication unit 38 receiving data from the scanner 6, extract a character string from the received data based on the setting table TL1 acquired in (2-iii).

As to read data having the data format of the print mark M (refer to FIG. 2) described above, the read data of 20 digits from the 1st digit is extracted as data (character string) corresponding to the "PRODUCT NAME", and the read data of two digits from the 21st digit is extracted as data (character string) corresponding to the "ADDITIONAL VALUE".

The firmware includes a print module 313 (example of a print unit) for printing a character string, which is extracted by the character string extraction module 312, on a label. Upon executing the print module 313, the issuance data is converted into bitmap data for printing (print data), and line data that is print data per line is sequentially sent to the print unit 36.

The feed unit 35 and the print unit 36 perform printing based on the line data that is sequentially sent.

The feed unit 35 includes a platen roller 45 (refer to FIG. 3) and includes a motor driving circuit and a stepping motor, which are not shown, and it feeds the continuous paper P in the printer 3. In one example, on the basis of a feed request of the firmware, the motor driving circuit drives the stepping motor that controls rotation of the platen roller 45, to feed the continuous paper P.

The print unit 36 includes a thermal head 46 (refer to FIG. 3) and a head driving circuit, which is not shown. The head driving circuit selectively supplies electric current to each heating element of the thermal head 46 based on the line data, to print a label on the continuous paper P.

(1-4-3) Scanner 6

As shown in FIG. 12, the scanner 6 includes a control unit 61, a light source 62, an image processor 63, and a short-range communication unit 64 (example of a data transmission unit). The short-range communication unit 64 is a communication interface for wirelessly communicating with the printer 3 in accordance with Bluetooth (registered trademark).

The control unit 61 is composed mainly of a microprocessor and controls the whole scanner 6.

The image processor 63 includes an image sensor using, for example, a charge coupled device (CCD). Light that is emitted from the light source 62 illuminates a print mark M (refer to FIG. 2), and the light reflected back from the print mark M is imaged by the image sensor. Thus, the image sensor captures an image of the print mark M.

The control unit 61 obtains the read data by extracting the two-dimensional code from this image and decoding it. The control unit 61 that has obtained the read data controls the short-range communication unit 64 so as to transmit the read data to the printer 3.

(1-4-4) Server 5

As shown in FIG. 12, the server 5 includes a control unit 51, a storage 52, and a communication unit 53. The communication unit 53 is a communication interface for communicating with the PC 2 and the printer 3.

The storage 52 is a mass storage device, such as a hard disk drive (HDD), and stores the format file sent from the PC 2 in associated with the log-in ID.

The control unit 51 is composed mainly of a microprocessor and controls the whole server 5. In one example, the control unit 51 controls the communication unit 53 so as to transmit the format file in accordance with a request from the printer 3.

(1-5) Operation of Data Distribution System 1

Figure 13:
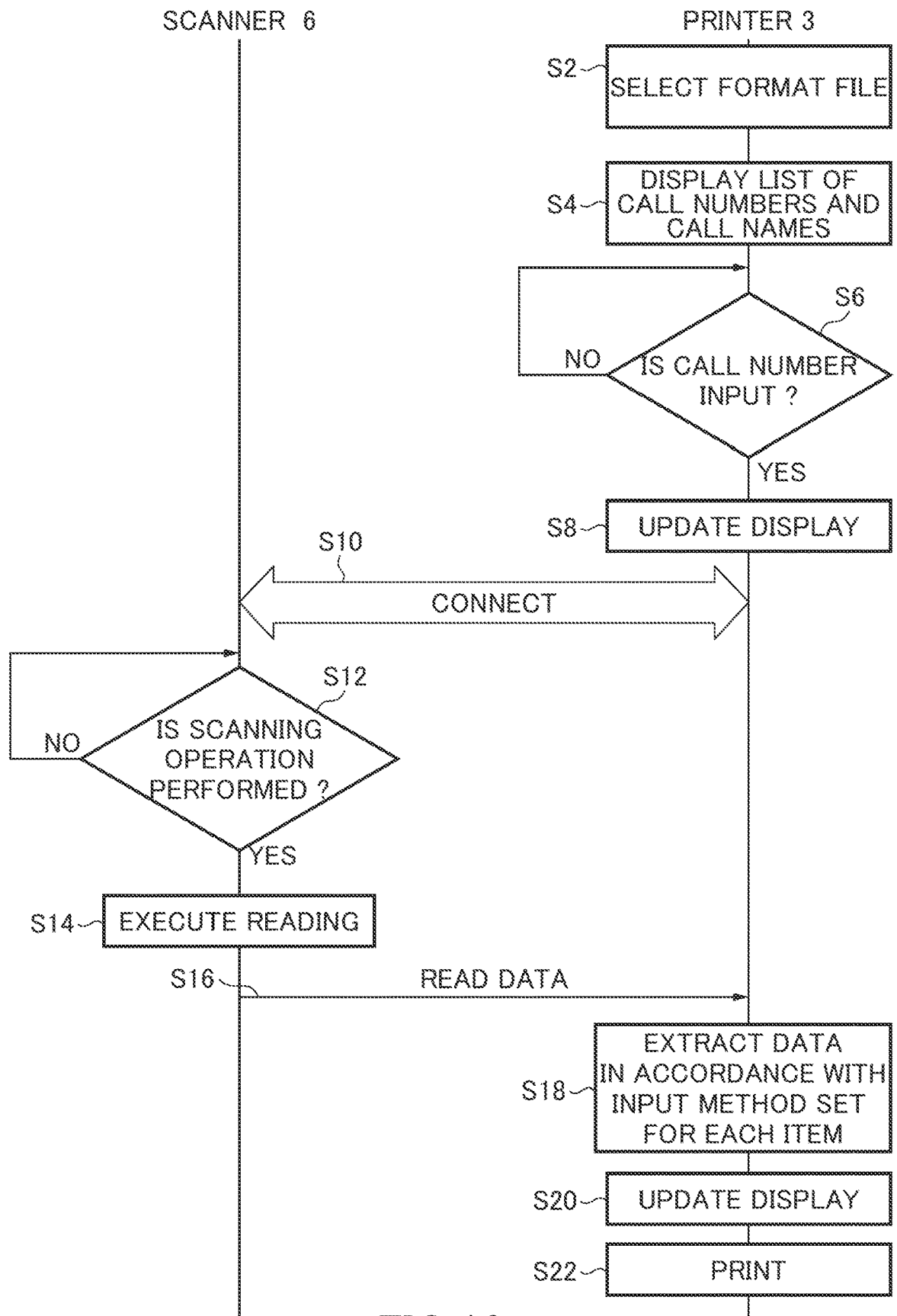
FIG. 13 is a sequence chart for issuing a label by the data distribution system according to the first embodiment.

Next, operation of the data distribution system 1 of this embodiment will be described with reference to FIG. 13. FIG. 13 is a sequence chart for issuing a label by the data distribution system, according to this embodiment. The following description is appropriately associated with the printer screens shown in FIG. 11.

Although not shown by the sequence chart in FIG. 13, it is assumed that the printer 3 has already downloaded a format file from the server 5 in advance. The downloaded format file contains layout data and a call table of a label to be issued.

The label issuance application of the printer 3 selects a format file in accordance with a user operation (step S2). In one example, as shown in the printer screen g1, the "FOOD DATA (LINKED TO SCANNER)" is selected. Then, a list of the call numbers and the call names is displayed by referring to the call table contained in the selected format file (step S4; printer screen g2).

At this time, the call number may be input, or in more detail, one pair of the call numbers and the call names may be selectively input. In this case, the label issuance application refers to the issuance data corresponding to the call number in the call table and updates the screen to a screen containing the issuance data display section 106 (step S8; printer screen g3). As shown by the examples in FIGS. 7 and 8, the method of inputting data of one of the items in the issuance data may be set so that read data, which is obtained from the scanner 6, will be referred to. In this case, the label issuance application controls the short-range communication unit 38 to establish a wireless communication with the scanner 6 in accordance with Bluetooth (registered trademark) (step S10).

The label issuance application waits until read data is received. Upon recognizing operation that a user scans one of the print marks M on the mark display paper MP (step S12: YES), the scanner 6 reads the print mark M (step S14). Thereafter, the scanner 6 transmits the read data to the printer 3 (step S16).

After the printer 3 receives the read data, the label issuance application extracts data (character string) corresponding to each item from the received read data, in accordance with the setting of the input method set for each item (step S18). The information relating to the setting of the input method for each item is contained in the layout data. The setting of the input method for each item specifies the start digit and the number of digits of the read data to be extracted, as shown by the examples in FIGS. 7 and 8. The label issuance application that has extracted the data updates the screen to a screen in which the extracted data (character string) is associated with each item (step S20; printer screen g4).

Thereafter, in accordance with operation for issuance instruction by a user, the label issuance application prints and issues a label PL in cooperation with the firmware (step S22).

As described above, in the data distribution system 1 of this embodiment, the printer 3 extracts a character string (character string corresponding to each item) to be printed, from the read data received from the scanner 6, in accordance with the setting of the data input method for each item (that is, setting in the setting table TL1), which is acquired from the PC 2 via the server 5. Then, the printer 3 prints the character string on a label. The setting of the input method is, for example, defined by the start digit and the number of digits of the read data, as shown by the examples in FIGS. 7 and 8. In this case, it is possible to easily adapt to read data having a new data format due to change in the data format, which is received from the scanner 6, by re-designating the start digit and the number of digits in setting the input method.

If such setting of the input method were employed in the printer driver of the printer 3, a new printer driver would have to be installed for all printer 3 of distribution destination. In contrast, the data distribution system 1 eliminates the need for complicated operations in the printer 3, such as adapting the printer 3 to change in the data format. This is because the information relating to setting of the input method corresponding to the data format of read data from the scanner 6 is contained in the format file that is downloaded from the server 5.

In this embodiment, the setting for extracting a character string, which corresponds to each item, from read data, is defined by the start digit and the number of digits of the read data. However, this setting is merely for an example. Setting for extracting a character string from read data may be freely performed in accordance with the data format of data that the printer 3 receives in conformity with a predetermined communication protocol.

(2) Second Embodiment

Hereinafter, a second embodiment of the present invention will be described with reference to FIGS. 14 to 18.

Whereas the scanner 6 is employed as the external device of the printer 3 in the first embodiment, a scale 7 is referred to as the external device of the printer 3 in this embodiment.

Figure 14:
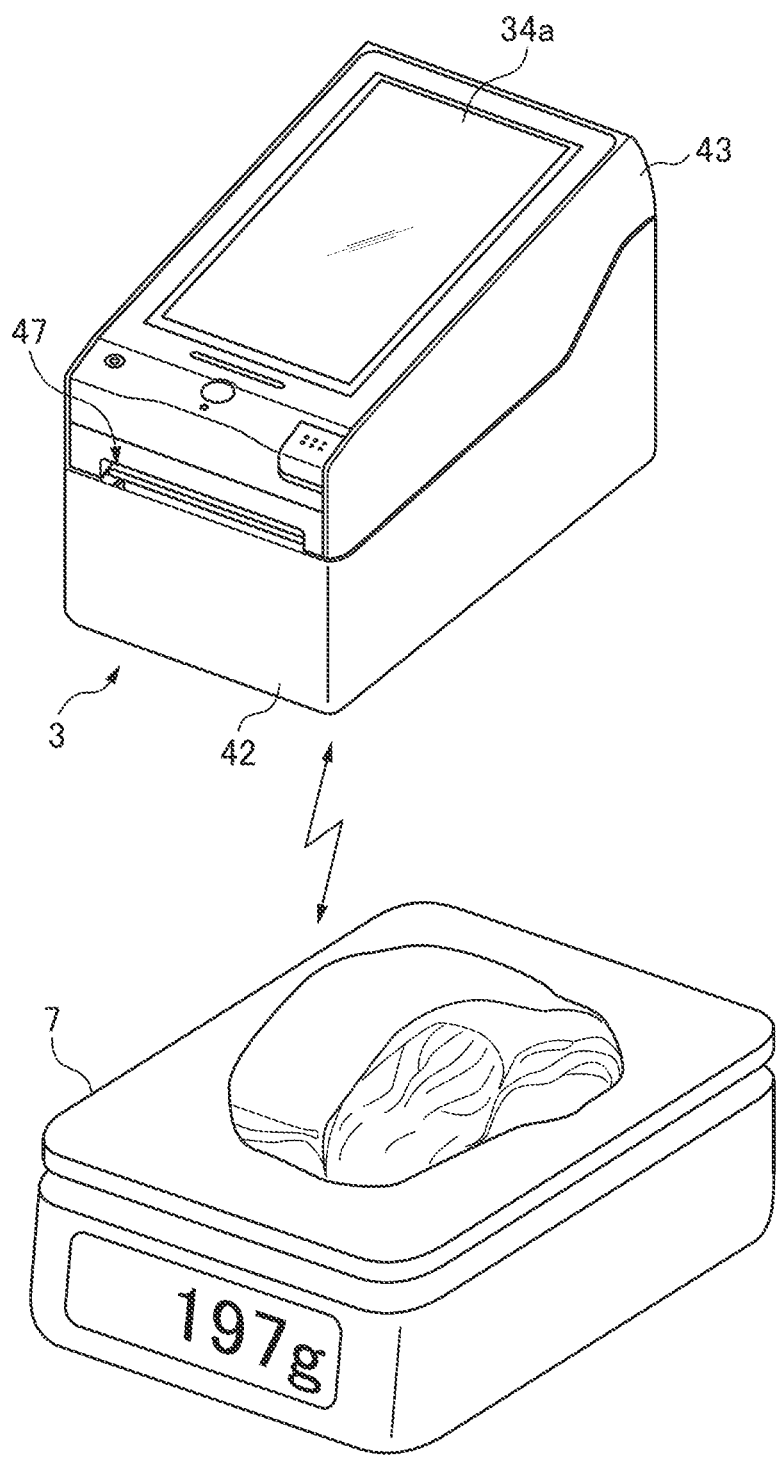
FIG. 14 shows a situation of issuing a label by the printer according to a second embodiment.

FIG. 14 corresponds to FIG. 2 that is referred to in the first embodiment and shows a situation of issuing a label by the printer 3 according to this embodiment. As shown in FIG. 14, the scale 7 and the printer 3 can wirelessly communicate with each other in accordance with, for example, Bluetooth (registered trademark).

The scale 7 is used in, for example, selling food, such as meat, by weight in a store, and it transmits measurement data containing the weight of the food to the printer 3 by wireless communication. The printer 3 extracts a character string indicating actual data (that is, value of weight itself) based on the measurement data received from the scale 7, and it prints and issues a label to be affixed to the food.

Figure 15:
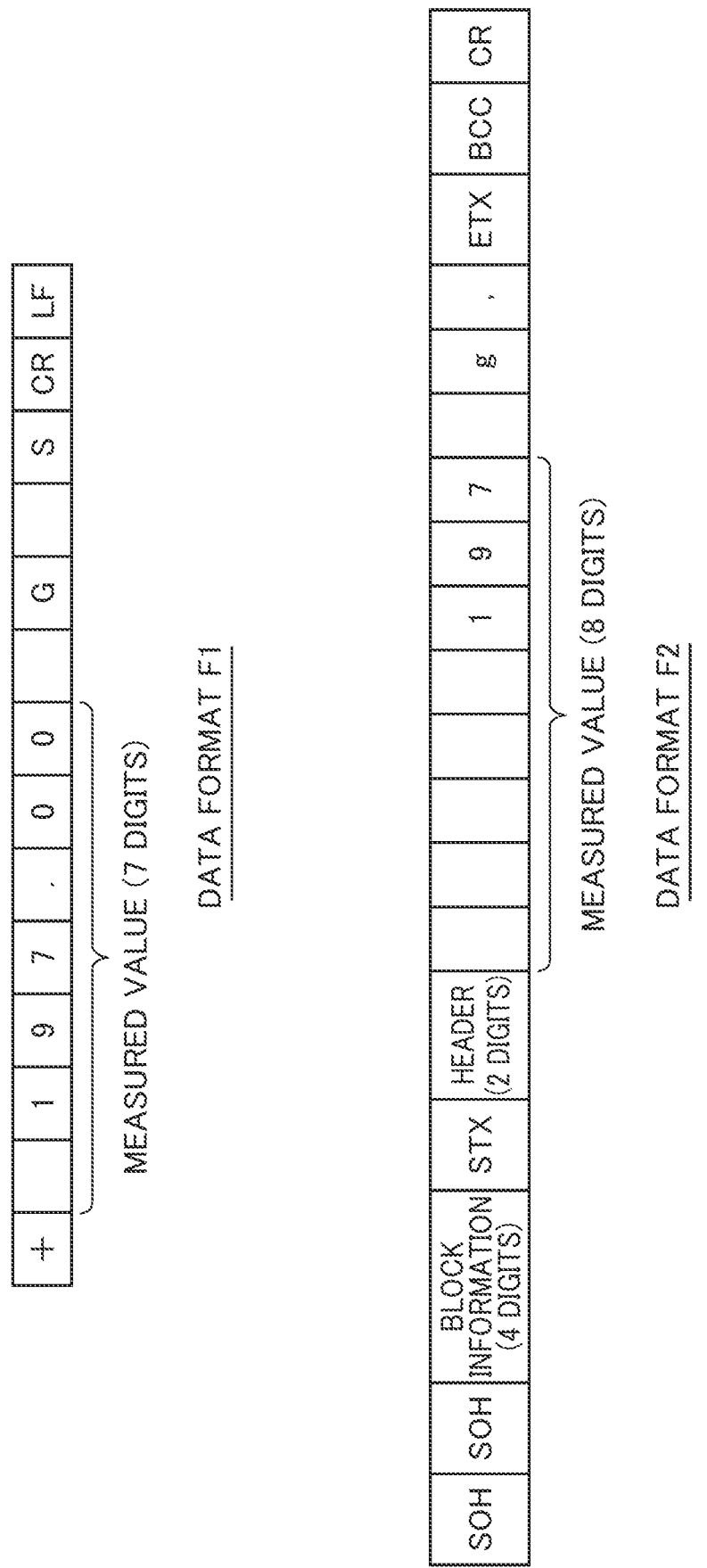
FIG. 15 shows examples of different data formats of data sent from scales.

FIG. 15 shows examples of different data formats F1 and F2 of measurement data sent from the scale 7. For example, scales 7 that are manufactured by different manufacturing companies transmit measurement data having specifications unique to respective companies. Thus, the data formats can differ from each other in some cases, as shown in FIG. 15.

In one example, the data format F1 in FIG. 15 has 14 digits in total and shows a measured value by 7 digits from the 2nd digit, and a control character is assigned to another digit (each of the 1st digit and the 9th and the following digits).

On the other hand, the data format F2 in FIG. 15 has 23 digits in total and shows a measured value by 8 digits from the 10th digit, and a control character is assigned to another digit (each of the 1st to the 9th digits and each of the 18th and the following digits).

In this embodiment, as in the case of the first embodiment, the input method of data for each object that is defined in a label design, is set by the label production application in the PC 2. In the example of this embodiment, an object corresponding to the item "(INP-DEV)" and an object corresponding to an item "WEIGHT" are defined.

Although not shown in the drawing, in the case of selecting the object corresponding to the item "(INP-DEV)", the input method "AT THE TIME OF ISSUANCE (DATA)" is selected in the object property setting section. The "AT THE TIME OF ISSUANCE (DATA)" means that input data is measurement data that the printer 3 receives from the scale 7 at the time of issuing a label. In addition, in the case of selecting the object corresponding to the item "WEIGHT", the input method "REFER/COMBINE" is selected in the object property setting section, and it is set so that measurement data received from the scale 7 will be referred to, in detail setting (refer to FIG. 7).

Figure 16:
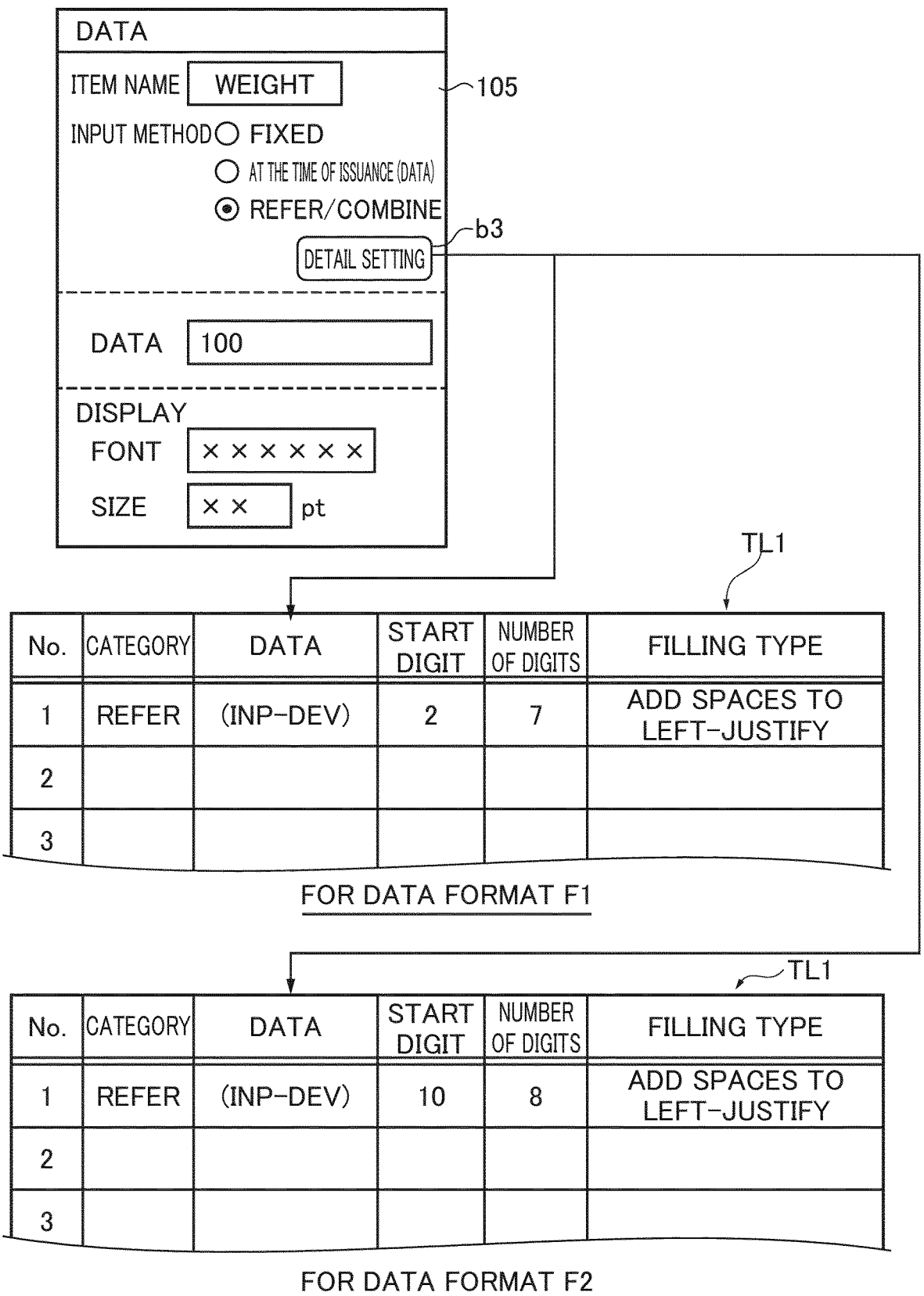
FIG. 16 illustrates a setting difference between different data formats in a data distribution system according to the second embodiment.

The settings of the input methods of data corresponding to the data formats F1 and F2 in FIG. 15 are shown in FIG. 16. FIG. 16 shows settings of the input methods respectively corresponding to the data formats F1 and F2 in FIG. 15, in the object property setting section 105 of the project file creation screen of the label production application, in a manner similar to the examples shown in FIGS. 7 and 8. As shown in FIG. 16, in order to correctly extract a measured value from measurement data, the start digit is set to 2, and the number of digits is set to 7, for the data format F1, whereas the start digit is set to 10, and the number of digits is set to 8, for the data format F2.

Figure 17:
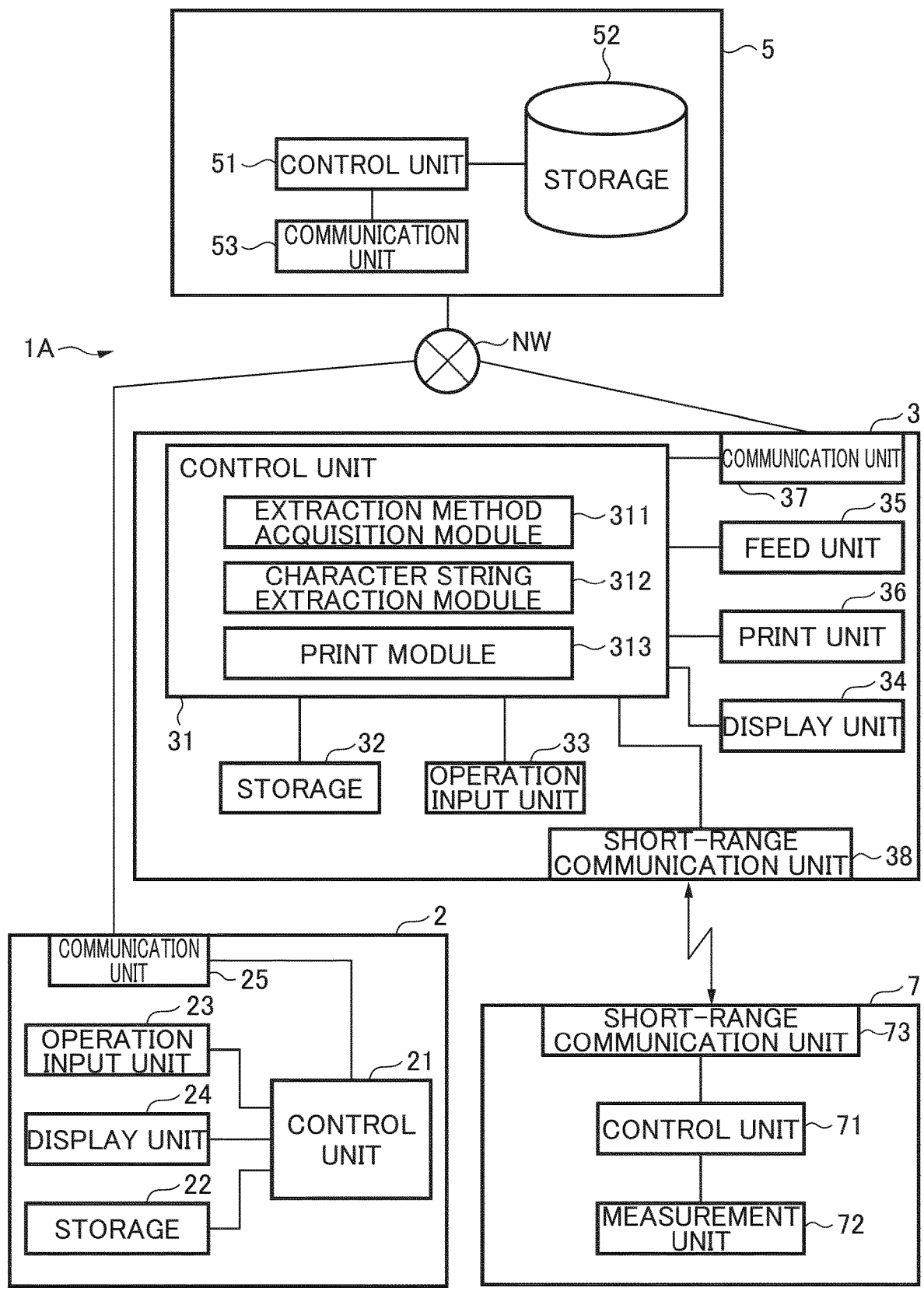
FIG. 17 is a block diagram of each device of the data distribution system according to the second embodiment.

FIG. 17 is a block diagram of each device of the data distribution system of this embodiment. FIG. 17 includes the scale 7 instead of the scanner 6, which is different from FIG. 12 corresponding to the first embodiment. In consideration of this, duplication description of each device other than the scale 7 will be omitted.

As shown in FIG. 17, the scale 7 includes a control unit 71, a measurement unit 72, and a short-range communication unit 73.

The control unit 71 is composed mainly of a microprocessor and controls the whole scale 7.

The measurement unit 72 has a load cell and transmits to the control unit 71 a signal measured by the load cell. The control unit 71 converts the measurement signal, which is obtained from the measurement unit 72, into a digital signal (measured value) and generates measurement data containing the measured value as a character string in a predetermined data format. The control unit 71 then controls the short-range communication unit 73 so as to transmit the measurement data to the printer 3.

The control unit 71 preferably performs controlling so that the measurement data containing the measured value as a character string will be sent to the printer 3 at the time variations in result measured by the measurement unit 72 fall within a predetermined value. In one example, in selling food by weight, a worker may put the food on the scale 7 in a relatively rough manner, whereby a measured value may vary (may not be stable). In such a case, controlling is preferably performed so as to wait until variations in measured value fall within a predetermined value and to then transmit measurement data containing the measured value to the printer 3. This allows the value of weight to be printed by the printer 3, more accurate.

Figure 18:
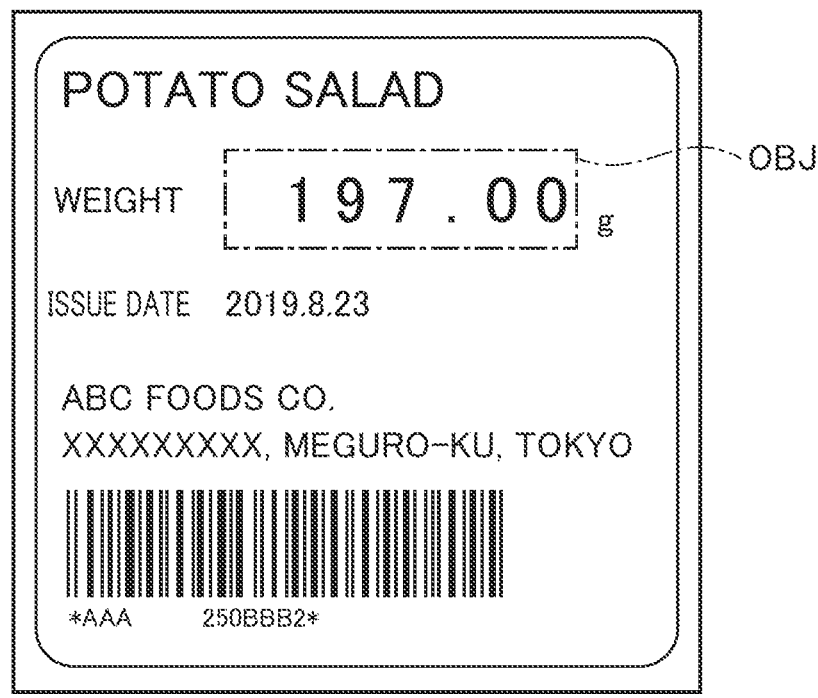
FIG. 18 shows labels that are issued based on data having different data formats, by the printer according to the second embodiment.
Figure 18:
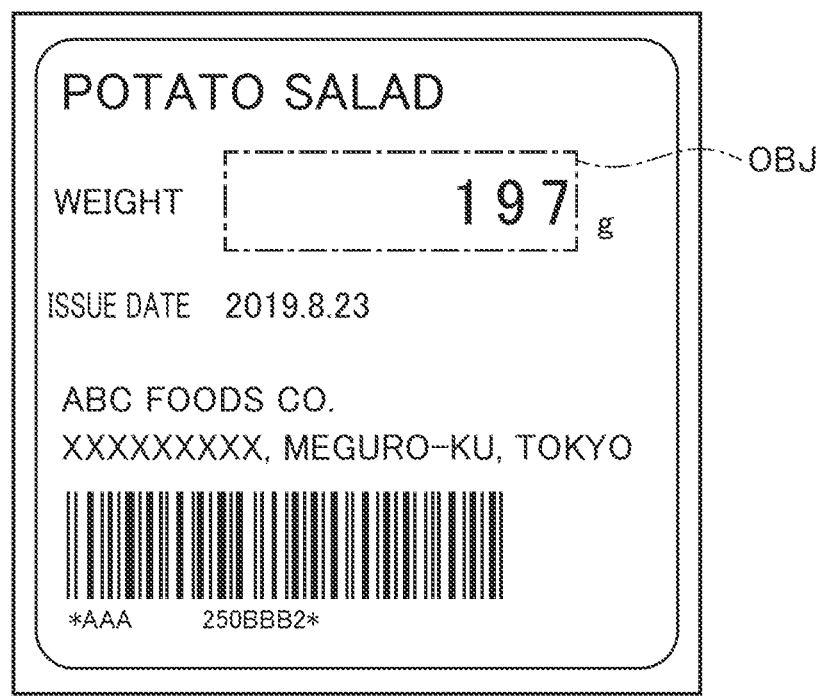

FIG. 18 shows examples of labels issued by the printer 3 in the cases of receiving measurement data having the data formats F1 and F2 that are different from each other. Each data (character string) corresponding to the item "WEIGHT" is a measured value having a corresponding data format shown in FIG. 15. The drawing shows that the two labels have different indication forms due to the differences in the number of digits and in character string of the data formats.

As described above, in the data distribution system of this embodiment, the printer 3 extracts a character string to be printed, from the read data received from the scale 7, in accordance with the setting of the data input method for each item, which is acquired from the PC 2 via the server 5. Then, the printer 3 prints the character string on a label. Thus, for example, even in a case in which a different scale is used in a store in the midst of implementation, and accordingly, the printer 3 receives measurement data having a data format different from before, it is possible to easily adapt to the measurement data having a new data format.

The object property setting section 105 (refer to FIG. 4) of the label production application is preferably provided with a check box for whether to print data. This enables measurement data having different data formats to be adapted to one layout data. In one example, two objects are defined in the design window 103, and data having different data formats are associated respectively to the objects. With respect to each of the data corresponding to the two objects, a check box for whether to print is appropriately turned on and off in the object property setting section 105.

In the label design shown as an example in FIG. 4, the object OBJ4 corresponding to the item name "(INP-DEV)" (that is, read data from the scanner 6) is set. The character string of this item is not printed in many actual cases. In order to not print the character string of this item, it is set (a check box is turned on) so that the data corresponding to the object OBJ4 will not be printed, in the object property setting section 105.

This embodiment describes a case of connecting the printer 3 and the scale 7 by wireless communication, such as Bluetooth (registered trademark). Use of wireless communication provides the following advantage. In one example where a product in a clean room is weighed, and a label containing this measurement result is issued, the label can be issued while the printer 3 is disposed outside the clean room.

(3) Third Embodiment

Next, a third embodiment of the present invention will be described. Compared with the second embodiment, selection of the issuance data is automatically performed in accordance with measurement data received from the scale 7 in the third embodiment.

In the second embodiment, as shown by the examples in FIGS. 15 and 16, multiple layout data for different data formats are created, and a call table containing multiple issuance data corresponding to the multiple layout data is created, in the PC 2. The printer 3 displays, on the display panel 34a, the multiple issuance data, which is contained in the call table created in the PC 2, in the format file downloaded from the PC 2. A user operates to select issuance data having a data format corresponding to the scale 7 that communicates with the printer 3, from the displayed multiple issuance data.

On the other hand, in the third embodiment, the printer 3 analyzes measurement data received from the scale 7 and automatically selects issuance data corresponding to the data format of the received measurement data, from multiple issuance data.

In this embodiment, the printer 3 acquires a format file from the PC 2, as in the case of the second embodiment. Specifically, the following processing is performed.

(1-i) Layout files that contain setting tables corresponding to different data formats, are created in the PC 2. In one example, layout files La, Lb, and Lc that contain setting tables Ta, Tb, and Tc (each is an example of extraction setting information) corresponding to data input methods of scales 7 of manufacturing companies A, B, and C, are created. A data input method that conforms to a data format specific to a corresponding manufacturing company is described in each setting table.

(1-ii) A call table containing issuance data Ia, Ib, and Ic (for example, respectively corresponding to call Nos. 1 to 3) for respectively specifying the layout files La, Lb, and Lc, is created in the PC 2.

(1-iii) A project file containing the created layout data and call table is converted into a format file in the PC 2, and this format file is uploaded to the server 5.

(1-iv) The printer 3 downloads the format file from the server 5 and stores it in the storage 32. That is, the data format acquisition module 311 of the printer 3 of this embodiment acquires multiple issuance data corresponding to multiple setting tables that specify mutually different methods of extracting a character string.

The printer 3 of this embodiment performs the following processing upon receiving measurement data from the scale 7.

(2-i) The printer 3 analyzes the measurement data received from the scale 7 and determines the data format of the measurement data. The measurement data can be analyzed from various points of view. For example, on the basis of a preamble, a data length, a position of a predetermined control character, or the like, of the received data, it is possible to presume the digit from which the measured value starts in the data format. This presumption may be performed by comparing the data formats of multiple known measurement data, with a preamble, a data length, a position of a predetermined control character, or the like, of the actually received data.

(2-ii) The printer 3 selects issuance data in which the data input method corresponding to the data format of the measured data that is determined in the step (2-i) is set, from the multiple issuance data contained in the format file stored in the storage 32.

(2-iii) The printer 3 adopts the data input method that is set in the issuance data selected in the step (2-ii), to the measurement data received from the scale 7, and the printer 3 then extracts data corresponding to the item "WEIGHT".

In the steps (2-ii) and (2-iii), the character string extraction module 312 of the printer 3 of this embodiment selects issuance data corresponding to the data format of the measurement data received from the scale 7, from the multiple issuance data acquired in the step (1-iv), and it then extracts a character string from the measurement data based on the selected issuance data.

As described above, the printer 3 of this embodiment automatically selects issuance data in accordance with measurement data received from the scale 7. This eliminates the need for a user to operate to select issuance data that conforms to the scale 7, and therefore, issuing a label is more conveniently performed than in the case of the second embodiment.

Although some embodiments of the printer, the program, and the information processing system of the present invention are detailed above, the present invention should not be limited to the foregoing embodiments. In addition, the embodiments described above can be variously modified and altered within the scope not departing from the gist of the present invention.

In one example, multiple input methods corresponding to multiple data formats may be set in the printer 3 in advance. In this case, the printer 3 may determine the data format from among the multiple data formats, based on the data structure of received data from the external device, and it may extract data (character string) from the received data, in accordance with the determined data format. That is, the printer 3 may determine the data format of the received data and adjust the input method by itself.

The forgoing embodiments describe a case in which the printer 3 acquires a format file by downloading it from the server 5 after it is uploaded to the server 5. However, the method of acquiring a format file is not limited thereto. In one example, the PC 2 and the printer 3 may be connected by a USB cable, and a format file may be exported from the PC 2 to the printer 3.

The invention claimed is:

1. A printer communicable with an external device in accordance with a predetermined communication protocol, the printer comprising a processor configured to:
   receive data containing a character string to be printed, from the external device;
   acquire extraction setting information that is information relating to a method of extracting the character string contained in the received data, the extraction setting information indicating a start digit and a number of digits of the character string to be extracted;
   upon receiving the data from the external device, extract the character string from the received data, based on the acquired extraction setting information; and
   print the extracted character string on a print medium.

2. The printer according to claim 1, further comprising a storage that is configured to store print data containing a character string object within which a character string to be printed is assigned, the character string object being an object positioned within an effective print region of the print medium,
   wherein the processor is configured to print the character string, which is extracted by the extraction unit, on the print medium based on the print data, in such a manner that the character string is contained within the character string object.

3. A non-transitory computer-readable storage medium storing a program for causing a processor to execute a method
   when installed in a printer configured to receive data containing a character string to be printed, from an external device in accordance with a predetermined communication protocol, the method comprising:
   acquiring extraction setting information that is information relating to a method of extracting the character string contained in the data received from the external device, the extraction setting information indicating a start digit and a number of digits of the character string to be extracted;

upon receiving the data from the external device, extracting the character string from the received data, based on the extraction setting information acquired by the acquiring; and printing the character string extracted by the extracting, on a print medium.

4. An information processing system comprising an external device and a printer that is communicable with the external device in accordance with a predetermined communication protocol, the external device including a data transmission unit that is configured to transmit to the printer, data containing a character string to be printed by the printer, the printer including a processor configured to:

receive the data from the external device;

acquire extraction setting information that is information relating to a method of extracting the character string contained in the received data, the extraction setting information indicating a start digit and a number of digits of the character string to be extracted;

upon receiving the data from the external device, extract the character string from the received data, based on the acquired extraction setting information; and print the extracted character string, on a print medium.

5. The information processing system according to claim 4, wherein the processor is configured to acquire plural pieces of extraction setting information, the plural pieces of extraction setting information being adapted for mutually different methods of extracting a character string, and the processor is configured to select a piece of extraction setting information corresponding to a data format of the data received from the external device, among the plural pieces of extraction setting information, and to extract the character string from the data based on the selected piece of extraction setting information.

6. The information processing system according to claim 4, wherein the external device is a scanner configured to read a code, and the data transmission unit is configured to transmit to the printer, data containing a character string corresponding to the code that have been read by the scanner.

7. The information processing system according to claim 4, wherein the external device is a scale that includes a measurement unit for measuring weight of an object, and the data transmission unit is configured to transmit to the printer, data containing a measured value as a character string, at the time variations in the weight measured by the measurement unit fall within a predetermined value.

8. The information processing system according to claim 5, wherein the external device is a scanner configured to read a code, and the data transmission unit is configured to transmit to the printer, data containing a character string corresponding to the code that have been read by the scanner.

9. The information processing system according to claim 5, wherein the external device is a scale that includes a measurement unit for measuring weight of an object, and the data transmission unit is configured to transmit to the printer, data containing a measured value as a character string, at the time variations in the weight measured by the measurement unit fall within a predetermined value.

* * * * *